(12) United States Patent
Kamada

(10) Patent No.: US 11,591,044 B2
(45) Date of Patent: Feb. 28, 2023

(54) BICYCLE SPROCKET ASSEMBLY AND BICYCLE SPROCKET

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 280 days.

(21) Appl. No.: 17/005,877

(22) Filed: Aug. 28, 2020

(65) Prior Publication Data

US 2022/0063760 A1 Mar. 3, 2022

(51) Int. Cl.
*B62M 9/10* (2006.01)
*F16H 55/30* (2006.01)
*B62M 9/124* (2010.01)

(52) U.S. Cl.
CPC .............. *B62M 9/10* (2013.01); *B62M 9/124* (2013.01); *F16H 55/30* (2013.01)

(58) Field of Classification Search
CPC .......... B62M 9/10; B62M 9/124; F16H 55/30
USPC ....................................................... 474/122
See application file for complete search history.

(56) References Cited

U.S. PATENT DOCUMENTS

| | | |
|---|---|---|
| 4,889,521 A | 12/1989 | Nagano |
| 6,340,338 B1 | 1/2002 | Kamada |
| 2013/0072334 A1* | 3/2013 | Braedt ...................... B62M 9/10 474/156 |
| 2015/0285358 A1* | 10/2015 | Numata .............. F16H 55/0873 474/160 |
| 2017/0029066 A1* | 2/2017 | Fukunaga ................ B62M 9/10 |
| 2018/0073620 A1* | 3/2018 | Fukunaga ............... F16H 55/30 |
| 2018/0099725 A1* | 4/2018 | Kamada .................. F16H 55/30 |
| 2020/0011408 A1 | 1/2020 | Yamazaki et al. |

FOREIGN PATENT DOCUMENTS

| | | | |
|---|---|---|---|
| CN | 106394797 | 2/2017 | |
| CN | 110682991 | 1/2020 | |
| JP | 3779706 B2 * | 5/2006 | .............. B62M 9/10 |

* cited by examiner

*Primary Examiner* — Gene O Crawford
*Assistant Examiner* — Emily R Kincaid
(74) *Attorney, Agent, or Firm* — Mori & Ward, LLP

(57) ABSTRACT

A bicycle sprocket assembly comprises a first sprocket and a second sprocket. The first sprocket includes a plurality of first sprocket teeth, a first sprocket inward surface, a first sprocket outward surface, and an axial space. The second sprocket includes a plurality of second sprocket teeth, a second sprocket inward surface, and a second sprocket outward surface. The axial space is defined between the first sprocket outward surface and an axially inward outer link plate in the axial direction while the second sprocket outward surface contacts an axially outward inner link plate in an engagement state where the one of the plurality of the second sprocket teeth is positioned between an axially inward inner link plate and the axially outward inner link plate in the axial direction. The axial space is larger than mm and equal to or smaller than 0.15 mm.

14 Claims, 28 Drawing Sheets

BICYCLE SPROCKET ASSEMBLY AND BICYCLE SPROCKET

BACKGROUND OF THE INVENTION

Field of the Invention

The present invention relates to a bicycle sprocket assembly and a bicycle sprocket.

Discussion of the Background

A human-powered vehicle includes a sprocket assembly configured to be engage with a chain. For example, such a sprocket assembly is known in U.S. Pat. Nos. 4,889,521 and 6,340,338. Based on such a prior art, it is the objective of the present invention to provide a bicycle sprocket assembly having smooth shifting performance. It is also the objective of the present invention to provide a bicycle sprocket having high rigidity. The bicycle sprocket assembly and the bicycle sprocket according to the present invention are usable for electrically assisted bicycles in which not only human torque but also motor torque are applied to bicycle sprockets.

SUMMARY OF THE INVENTION

In accordance with a first aspect of the present invention, a bicycle sprocket assembly comprises a first sprocket and a second sprocket. The first sprocket includes a first sprocket body, a plurality of first sprocket teeth, a first sprocket inward surface, and a first sprocket outward surface. The plurality of first sprocket teeth is disposed on an outer periphery of the first sprocket body. The plurality of first sprocket teeth defines a first maximum tooth-tip diameter. The first sprocket inward surface is configured to face toward an axial center plane of a bicycle in a mounting state where the bicycle sprocket assembly is mounted to the bicycle. The first sprocket outward surface is provided on a reverse side of the first sprocket inward surface in an axial direction with respect to a rotational center axis of the bicycle sprocket. The second sprocket is adjacent to the first sprocket without another sprocket therebetween in the axial direction. The second sprocket includes a second sprocket body, a plurality of second sprocket teeth, a second sprocket inward surface, and a second sprocket outward surface. The plurality of second sprocket teeth is disposed on an outer periphery of the second sprocket body. The plurality of second sprocket teeth defines a second maximum tooth-tip diameter smaller than the first maximum tooth-tip diameter. The second sprocket inward surface is configured to face toward the axial center plane of the bicycle in the mounting state. The second sprocket outward surface is provided on a reverse side of the second sprocket inward surface in the axial direction. The first sprocket includes an upshifting facilitation section and an axial space. The upshifting facilitation section is configured to facilitate an upshifting operation where a bicycle chain shifts from the first sprocket toward the second sprocket. The axial space is defined between the first sprocket outward surface of one of the plurality of first sprocket teeth and an axially inward outer link plate of a pair of opposed outer link plates of the bicycle chain in the axial direction while the second sprocket outward surface of one of the plurality of second sprocket teeth contacts an axially outward inner link plate of a pair of opposed inner link plates of the bicycle chain in an engagement state where the one of the plurality of the second sprocket teeth is positioned between an axially inward inner link plate and the axially outward inner link plate of the pair of opposed inner link plates in the axial direction. The axially inward outer link plate and an axially outward outer link plate of the pair of opposed outer link plates are spaced apart from each other in the axial direction in an assembled state of the bicycle chain. The axially inward inner link plate and the axially outward inner link plate of the pair of opposed inner link plates are spaced apart from each other in the axial direction in the assembled state of the bicycle chain. The axial space is larger than 0 mm and equal to or smaller than 0.15 mm.

With the bicycle sprocket assembly according to the first aspect, a downshifting operation where the bicycle chain shifts from the second sprocket toward the first sprocket is likely to unintentionally occur if the axial space is equal to or smaller than 0 mm. A larger impact is likely to be caused by such an unintentional downshifting operation. The downshifting operation is likely to be undesirably missed if the axial space is larger than 0.15 mm. Thus, in comparison with a first sprocket having an axial space which is equal to or smaller than 0 mm or is larger than 0.15 mm, it is possible to reduce the impact in the downshifting operation while ensuring the downshifting operation if a bicycle rider operates the downshifting operation.

In accordance with a second aspect of the present invention, the bicycle sprocket assembly according to the first aspect is configured so that the first sprocket includes a downshifting facilitation section configured to facilitate a downshifting operation where the bicycle chain shifts from the second sprocket toward the first sprocket.

With the bicycle sprocket assembly according to the second aspect, it is possible to effectively reduce the impact in the downshifting operation while reducing the unintentional downshifting operation in comparison with the first sprocket which does not have a downshifting facilitation section.

In accordance with a third aspect of the present invention, a bicycle sprocket comprises a sprocket body, a sprocket inward side, a sprocket outward side, and a plurality of sprocket teeth. The sprocket inward side is configured to be closer to an axial center plane of a bicycle than the sprocket outward side in a mounting state where the bicycle sprocket is mounted to the bicycle. The sprocket outward side is provided on a reverse side of the sprocket inward side in an axial direction with respect to a rotational center axis of the bicycle sprocket. The plurality of sprocket teeth is disposed on an outer periphery of the sprocket body. The plurality of sprocket teeth includes at least one recessed tooth having at least one recessed portion recessed from the sprocket outward side toward the sprocket inward side. The at least one recessed portion has a circumferentially upstream end and a circumferentially downstream end opposite to the circumferentially upstream end in a circumferential direction with respect to the rotational center axis and with respect to a driving rotational direction. The circumferentially upstream end has a first axial-thickness defined on a pitch circle diameter of the bicycle sprocket. The circumferentially downstream end has a second axial-thickness defined on the pitch circle diameter of the bicycle sprocket. The second axial-thickness is smaller than the first axial-thickness. The first axial-thickness is equal to or larger than 1.3 mm. The third aspect can be combined with the first aspect or the second aspect.

With the bicycle sprocket according to the third aspect, the at least one recessed tooth suppresses an increase in a weight of the bicycle sprocket because the at least one recessed tooth has the second axial thickness smaller than the first axial thickness. Furthermore, the first axial-thickness equal to or larger than 1.3 mm ensures strength of the at least one recessed tooth in comparison with a bicycle sprocket in which a first axial-thickness is smaller than 1.3 mm. Thus, it is possible to ensure the strength of the at least one recessed tooth while suppressing the increase in the weight of the bicycle sprocket.

In accordance with a fourth aspect of the present invention, the bicycle sprocket assembly according to the third aspect is configured so that each of the plurality of sprocket teeth is configured to enter each of an outer-link space defined between a pair of opposed outer link plates of a bicycle chain and an inner-link space defined between a pair of opposed inner link plates of the bicycle chain.

With the bicycle sprocket according to the fourth aspect, a total number of the plurality of sprocket teeth can be an odd number.

In accordance with a fifth aspect of the present invention, the bicycle sprocket according to the third or fourth aspect is configured so that the at least one recessed portion has a sloping surface extending between the circumferentially upstream end and the circumferentially downstream end.

With the bicycle sprocket according to the fifth aspect, the sloping surface can make the downshifting operation smoother, reducing noise in the downshifting operation and/or wear of the bicycle sprocket.

In accordance with a sixth aspect of the present invention, the bicycle sprocket according to the third or fourth aspect is configured so that the at least one recessed portion has at least one stepped surface provided between the circumferentially upstream end and the circumferentially downstream end.

With the bicycle sprocket according to the sixth aspect, it is possible to improve dimension accuracy of the at least one recessed portion, improving manufacturing efficiency of the bicycle sprocket.

In accordance with a seventh aspect of the present invention, the bicycle sprocket according to the sixth aspect is configured so that the at least one stepped surface of the at least one recessed portion forms at least three steps.

With the bicycle sprocket according to the seventh aspect, it is possible to improve dimension accuracy of the at least one recessed portion, improving manufacturing efficiency of the bicycle sprocket.

In accordance with an eighth aspect of the present invention, the bicycle sprocket according to any one of the third to seventh aspects further comprises an upshifting facilitation section and a downshifting facilitation section. The upshifting facilitation section is configured to facilitate an upshifting operation where a bicycle chain shifts from the bicycle sprocket toward a smaller sprocket adjacent to the bicycle sprocket without another sprocket therebetween in the axial direction. The downshifting facilitation section is configured to facilitate a downshifting operation where the bicycle chain shifts from the smaller sprocket toward the bicycle sprocket. The downshifting facilitation section is disposed on an upstream side of the upshifting facilitation section in the circumferential direction.

With the bicycle sprocket according to the eighth aspect, it is possible to increase a width of some of the plurality of sprocket teeth, improving strength of the bicycle sprocket.

In accordance with a ninth aspect of the present invention, the bicycle sprocket according to the eighth aspect is configured so that the upshifting facilitation section is faulted by a first tooth group in the plurality of sprocket teeth. The downshifting facilitation section is formed by a second tooth group in the plurality of sprocket teeth. The second tooth group is entirely different from the first tooth group.

With the bicycle sprocket according to the ninth aspect, it is possible to increase a thickness of some of the plurality of sprocket teeth, improving strength of the bicycle sprocket.

In accordance with a tenth aspect of the present invention, a bicycle sprocket comprises a sprocket body, a plurality of sprocket teeth, an upshifting facilitation section, and a downshifting facilitation section. The plurality of sprocket teeth is disposed on an outer periphery of the sprocket body. The upshifting facilitation section is configured to facilitate an upshifting operation where a bicycle chain shifts from the bicycle sprocket toward a smaller sprocket adjacent to the bicycle sprocket without another sprocket therebetween in an axial direction with respect to a rotational center axis of the bicycle sprocket. The upshifting facilitation section is formed by a first tooth group in the plurality of sprocket teeth. The downshifting facilitation section is configured to facilitate a downshifting operation where the bicycle chain shifts from the smaller sprocket toward the bicycle sprocket. The downshifting facilitation section is formed by a second tooth group in the plurality of sprocket teeth. The second tooth group is entirely different from the first tooth group. The downshifting facilitation section is disposed on an upstream side of the upshifting facilitation section in a circumferential direction with respect to the rotational center axis of the bicycle sprocket and with respect to a driving rotational direction. At least one sprocket tooth of the plurality of sprocket teeth has an axial tooth-bottom thickness that is equal to or larger than 1.7 mm. The tenth aspect can be combined with any one of the first to ninth aspects.

With the bicycle sprocket according to the tenth aspect, it is possible to improve durability of the bicycle sprocket while reducing impact in at least one of the upshifting operation and the downshifting operation.

In accordance with an eleventh aspect of the present invention, the bicycle sprocket according to the tenth aspect is configured so that the first tooth group of the upshifting facilitation section is adjacent to the second tooth group of the downshifting facilitation section without another tooth therebetween.

With the bicycle sprocket according to the eleventh aspect, it is possible to further improve durability of the bicycle sprocket while reducing impact in at least one of the upshifting operation and the downshifting operation.

In accordance with a twelfth aspect of the present invention, the bicycle sprocket according to the tenth or eleventh aspect is configured so that each of the plurality of sprocket teeth is configured to enter each of an outer-link space defined between a pair of opposed outer link plates of a bicycle chain and an inner-link space defined between a pair of opposed inner link plates of the bicycle chain.

With the bicycle sprocket according to the twelfth aspect, a total number of the plurality of sprocket teeth can be an odd number.

In accordance with a thirteenth aspect of the present invention, a bicycle sprocket comprises a sprocket body, a sprocket inward side, a sprocket outward side, and a plurality of sprocket teeth. The sprocket inward side is configured to be closer to an axial center plane of a bicycle than the sprocket outward side in a mounting state where the bicycle sprocket is mounted to the bicycle. The sprocket outward side is provided on a reverse side of the sprocket inward side in an axial direction with respect to a rotational center axis of the bicycle sprocket. The plurality of sprocket teeth is disposed on an outer periphery of the sprocket body. At least one of the plurality of sprocket teeth has a tooth tip, a tooth bottom and at least one tooth-tip chamfer formed on the tooth tip in at least one of the sprocket outward side and the sprocket inward side. The at least one tooth-tip chamfer has a radially outermost end and a radially innermost end with respect to a rotational center axis of the bicycle sprocket. A radial tooth-tip distance defined from the tooth bottom to the tooth tip in a radial direction with respect to the rotational center axis is equal to or larger than 4.5 mm. A radial chamfer distance defined from the tooth bottom to the radially innermost end of the at least one tooth-tip chamfer in the radial direction is equal to or larger than 3 mm. The thirteenth aspect can be combined with any one of the first to twelfth aspects.

With the bicycle sprocket according to the thirteenth aspect, the radial tooth-tip distance and the radial chamfer distance maintain a thickness of the at least one of the plurality of sprocket teeth while the tooth-tip chamfer ensures smooth engagement of the at least one of the plurality of sprocket teeth with a bicycle chain. Thus, it is possible to improve durability of the bicycle sprocket.

In accordance with a fourteenth aspect of the present invention, the bicycle sprocket according to the thirteenth aspect is configured so that the tooth tip has a circumferentially upstream tooth-tip end and a circumferentially downstream tooth-tip end opposite to the circumferentially upstream tooth-tip end in a circumferential direction with respect to the rotational center axis and with respect to a driving rotational direction. The circumferentially upstream tooth-tip end has a convex curvature portion configured to contact a chain roller of a bicycle chain during a driving operation of a bicycle.

With the bicycle sprocket according to the fourteenth aspect, the convex curvature portion further reduces wear of the at least one of the plurality of sprocket teeth. Thus, it is possible to reliably improve durability of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
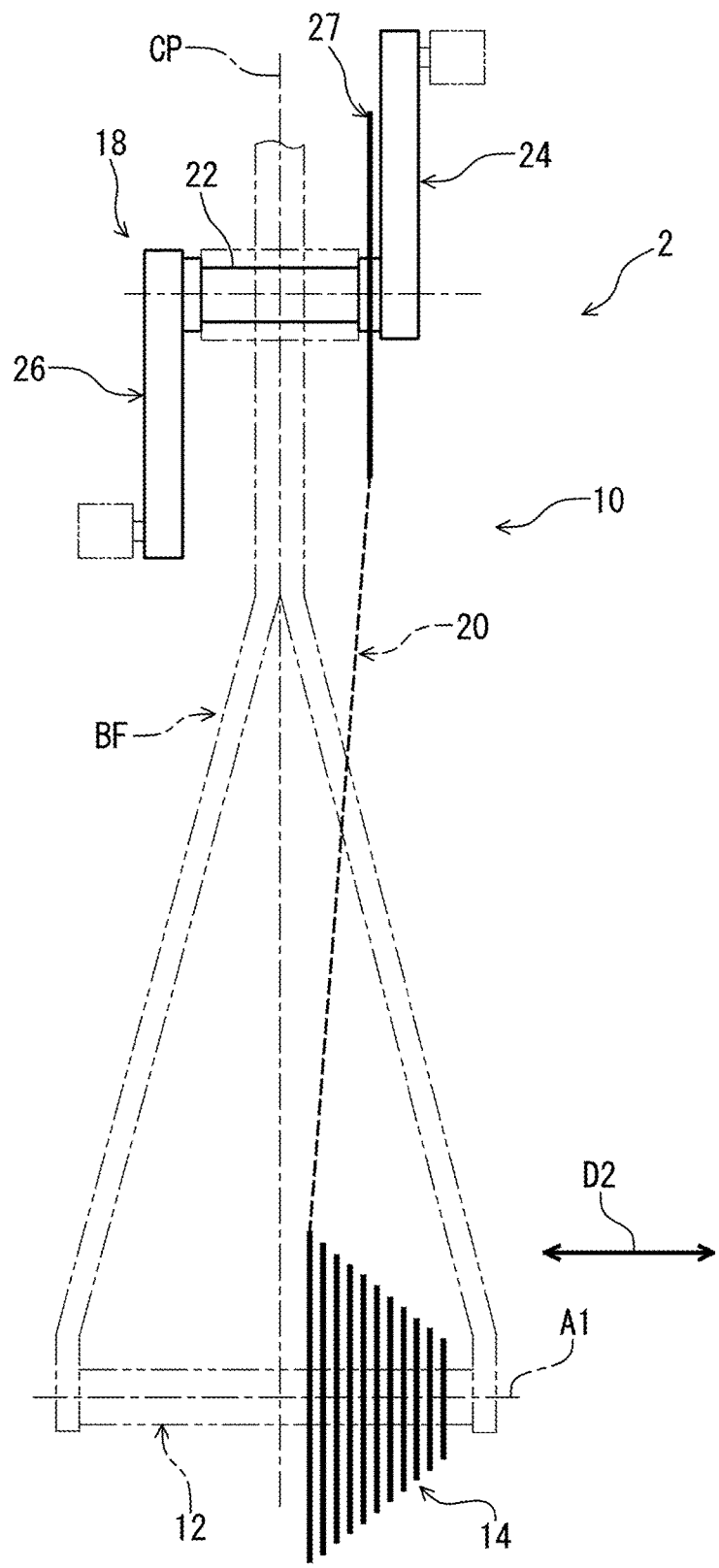
FIG. 1 is a schematic diagram of a bicycle including a bicycle sprocket assembly in accordance with an embodiment.

The embodiment(s) will now be described with reference to the accompanying drawings, wherein like reference numerals designate corresponding or identical elements throughout the various drawings.

As seen in FIG. 1, a bicycle 2 includes a bicycle drive train 10. The bicycle drive train 10 includes a bicycle hub assembly 12 and a bicycle sprocket assembly 14. The bicycle hub assembly 12 is secured to a bicycle frame BF. The bicycle sprocket assembly 14 is mounted on the bicycle hub assembly 12. The bicycle sprocket assembly 14 is rotatably supported by the bicycle hub assembly 12 relative to the bicycle frame BF about a rotational center axis A1. The bicycle 2 has an axial center plane CP.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle sprocket assembly 14 to transmit pedaling force from the front sprocket 27 to the bicycle sprocket assembly 14. The crank assembly 18 includes the front sprocket 27 as a single sprocket in the present embodiment. However, the crank assembly 18 can includes a plurality of front sprockets. The bicycle sprocket assembly 14 is a rear sprocket assembly. However, structures of the bicycle sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 14, should be interpreted relative to the bicycle equipped with the bicycle sprocket assembly 14 as used in an upright riding position on a horizontal surface.

Figure 2:
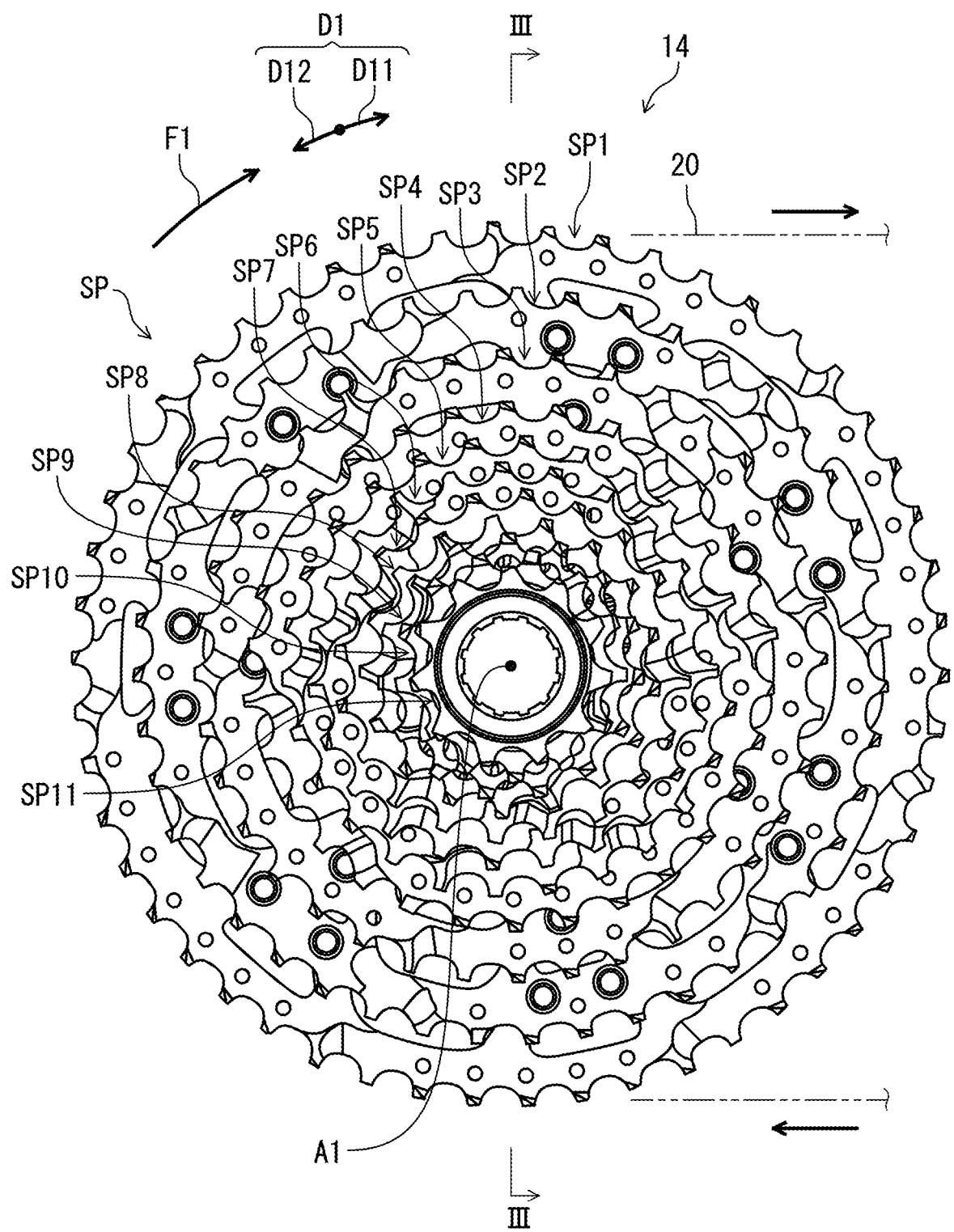
FIG. 2 is a side elevational view of the bicycle sprocket assembly of the bicycle illustrated in FIG. 1.

As seen in FIG. 2, the bicycle sprocket assembly 14 is configured to be engaged with the bicycle chain 20 to transmit driving rotational force F1 between the bicycle chain 20 and the bicycle sprocket assembly 14 during pedaling. The bicycle sprocket assembly 14 is rotated about the rotational center axis A1 in a driving rotational direction D11 during pedaling. The driving rotational direction D11 is defined along a circumferential direction D1 of the bicycle hub assembly 12 or the bicycle sprocket assembly 14. A reverse rotational direction D12 is an opposite direction of the driving rotational direction D11 and is defined along the circumferential direction D1.

The bicycle sprocket assembly 14 comprises a plurality of bicycle sprockets SP. The plurality of bicycle sprockets SP is configured to be engaged with the bicycle chain 20 to transmit the driving rotational force F1 between the bicycle chain 20 and the bicycle sprocket assembly 14 during pedaling. In the present embodiment, the plurality of bicycle sprockets SP includes bicycle sprockets SP1 to SP11. Each of the bicycle sprockets SP1 to SP11 is configured to be engaged with the bicycle chain 20 to transmit the driving rotational force F1 between the bicycle chain 20 and the bicycle sprocket assembly 14 during pedaling. However, a total number of the bicycle sprockets SP is not limited to the present embodiment.

Figure 3:
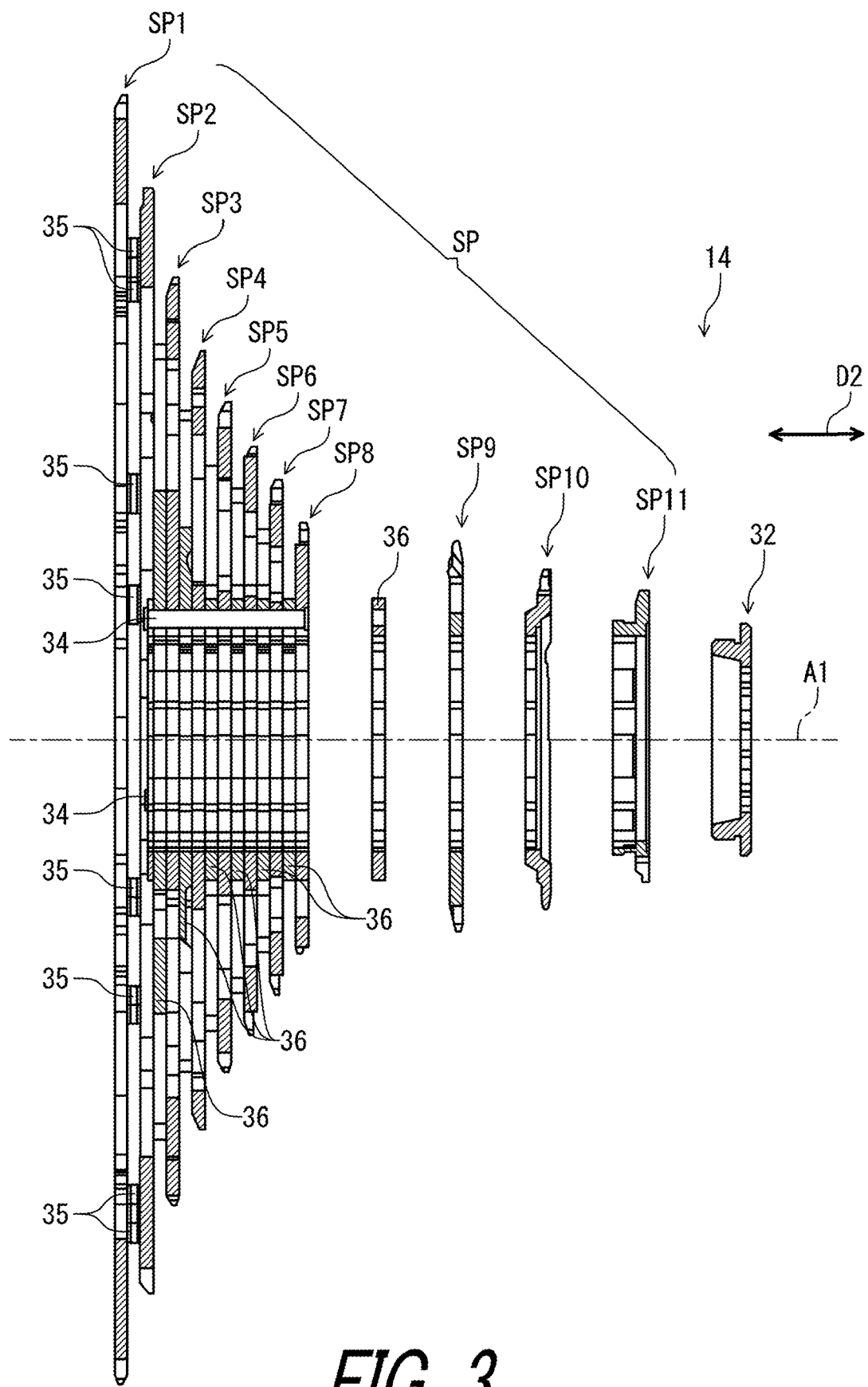
FIG. 3 is an exploded cross-sectional view of the bicycle sprocket assembly taken along line of FIG. 2.

As seen in FIG. 3, the bicycle sprockets SP1 to SP11 are arranged in an axial direction D2 with respect to the rotational center axis A1 The bicycle sprockets are coupled to each other with fasteners. The bicycle sprocket assembly 14 further comprises a lock member 32. The lock member 32 is secured to a sprocket support body of the bicycle hub assembly 12 (FIG. 1) to hold the bicycle sprocket assembly 14 relative to the sprocket support body of the bicycle hub assembly 12 (FIG. 1) in the axial direction D2.

The bicycle sprocket assembly 14 includes a plurality of coupling rods 34, a plurality of coupling members 35, and a plurality of spacers 36. The plurality of coupling rods 34 is configured to couple at least two sprockets of the bicycle sprockets SP1 to SP11. In the present embodiment, the plurality of coupling rods 34 is configured to couple the sprockets SP2 to SP8. The plurality of coupling members 35 is configured to couple the sprockets SP1 and SP2. The spacers 36 are provided between adjacent two sprockets of the plurality of sprocket teeth SP2 to SP9 in the axial direction D2 to provide an appropriate axial space between two adjacent sprockets.

In the present embodiment, the bicycle sprockets SP1 and SP2 can also be referred to as a first sprocket SP1 and a second sprocket SP2. The bicycle sprockets SP2 and SP3 can also be referred to as a first sprocket SP2 and a second sprocket SP3. The bicycle sprockets SP3 and SP4 can also be referred to as a first sprocket SP3 and a second sprocket SP4. The bicycle sprockets SP4 and SP5 can also be referred to as a first sprocket SP4 and a second sprocket SP5. The bicycle sprockets SP5 and SP6 can also be referred to as a first sprocket SP5 and a second sprocket SP6. The bicycle sprockets SP6 and SP7 can also be referred to as a first sprocket SP6 and a second sprocket SP7. The bicycle sprockets SP7 and SP8 can also be referred to as a first sprocket SP7 and a second sprocket SP8. The bicycle sprockets SP8 and SP9 can also be referred to as a first sprocket SP8 and a second sprocket SP9. The bicycle sprockets SP9 and SP10 can also be referred to as a first sprocket SP9 and a second sprocket SP10. The bicycle sprockets SP10 and SP11 can also be referred to as a first sprocket SP10 and a second sprocket SP11.

In other words, the bicycle sprocket assembly 14 comprises the first sprocket SP1 and the second sprocket SP2. The bicycle sprocket assembly 14 comprises the first sprocket SP2 and the second sprocket SP3. The bicycle sprocket assembly 14 comprises the first sprocket SP3 and the second sprocket SP4. The bicycle sprocket assembly 14 comprises the first sprocket SP4 and the second sprocket SP5. The bicycle sprocket assembly 14 comprises the first sprocket SP5 and the second sprocket SP6. The bicycle sprocket assembly 14 comprises the first sprocket SP6 and the second sprocket SP7. The bicycle sprocket assembly 14 comprises the first sprocket SP7 and the second sprocket SP8. The bicycle sprocket assembly 14 comprises the first sprocket SP8 and the second sprocket SP9. The bicycle sprocket assembly 14 comprises the first sprocket SP9 and the second sprocket SP10. The bicycle sprocket assembly 14 comprises the first sprocket SP10 and the second sprocket SP11.

Figure 4:
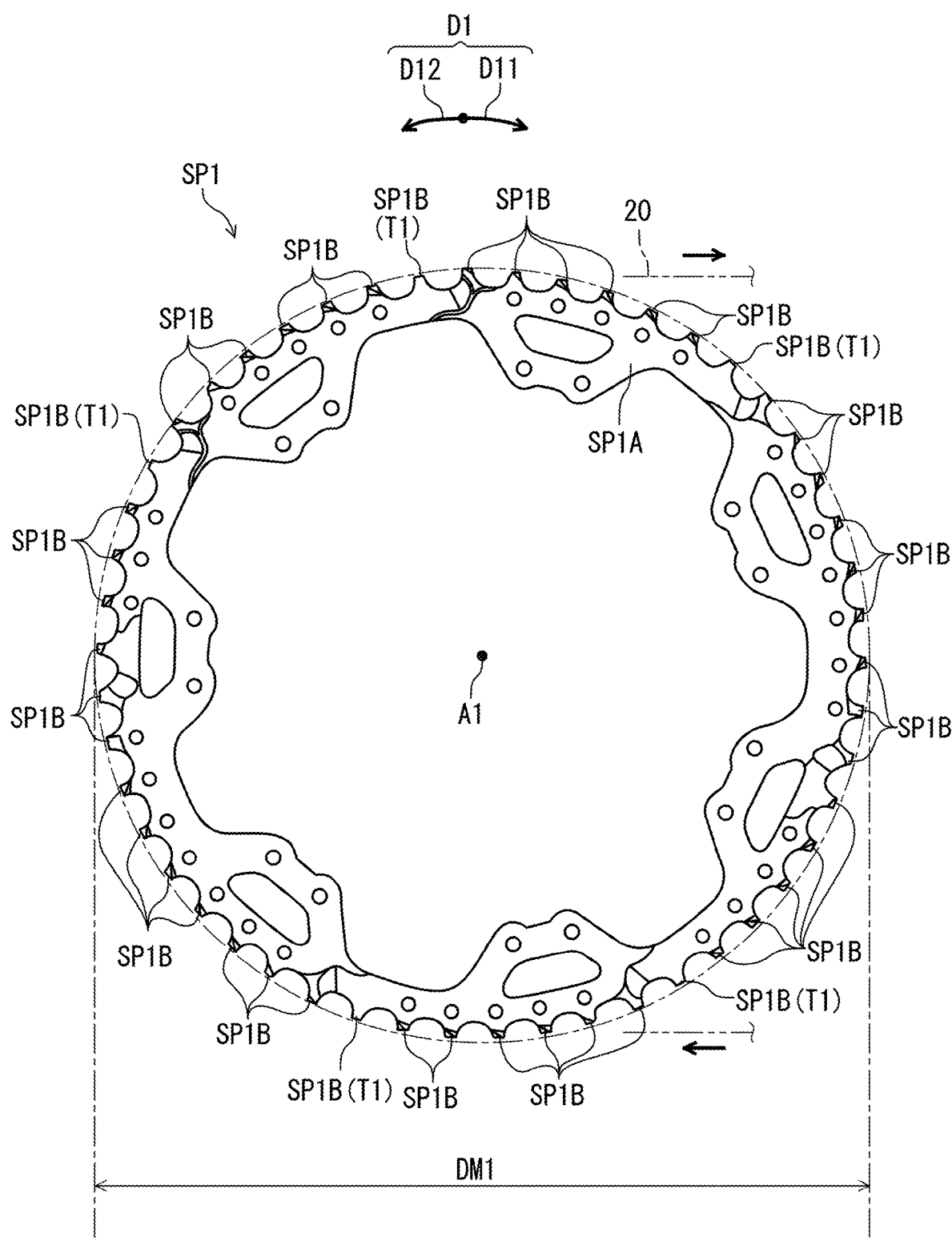
FIGS. 4 to 13 are side elevational views of bicycle sprockets of the bicycle sprocket assembly illustrated in FIG. 2.

As seen in FIG. 4, the bicycle sprocket SP1 includes a sprocket body SP1A and a plurality of sprocket teeth SP1B. The plurality of sprocket teeth SP1B extends radially outwardly from the sprocket body SP1A. The plurality of sprocket teeth SP1B is disposed on an outer periphery of the sprocket body SP1A. The plurality of sprocket teeth SP1B defines a maximum tooth-tip diameter DM1. The sprocket body SP1A can also be referred to as a first or second sprocket body SP1A. The plurality of sprocket teeth SP1B can also be referred to as a plurality of first or second sprocket teeth SP1B.

Figure 5:
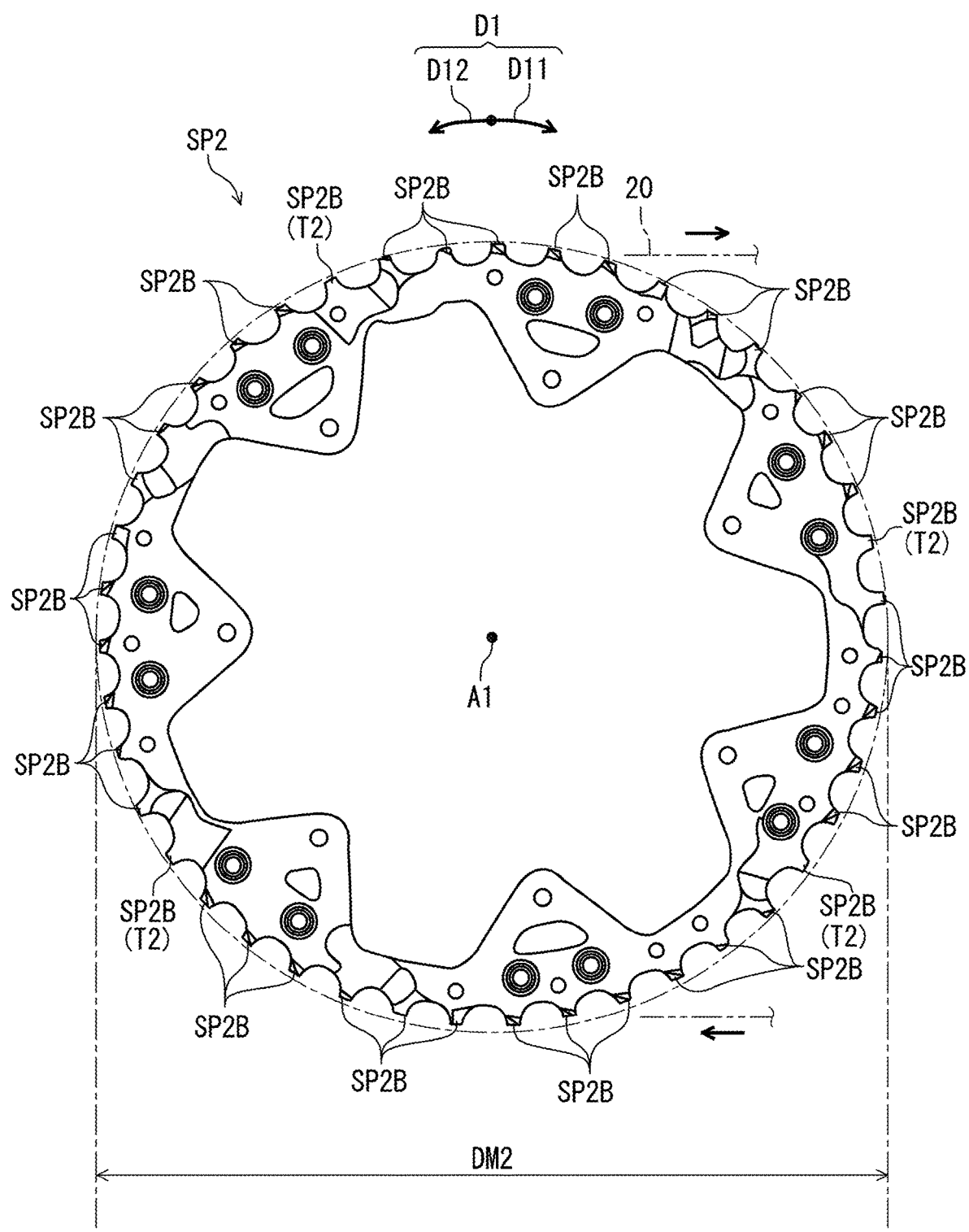

As seen in FIG. 5, the bicycle sprocket SP2 includes a sprocket body SP2A and a plurality of sprocket teeth SP2B. The plurality of sprocket teeth SP2B extends radially outwardly from the sprocket body SP2A. The plurality of sprocket teeth SP2B is disposed on an outer periphery of the sprocket body SP2A. The plurality of sprocket teeth SP2B defines a maximum tooth-tip diameter DM2. The sprocket body SP2A can also be referred to as a first or second sprocket body SP2A. The plurality of sprocket teeth SP2B can also be referred to as a plurality of first or second sprocket teeth SP2B.

Figure 6:
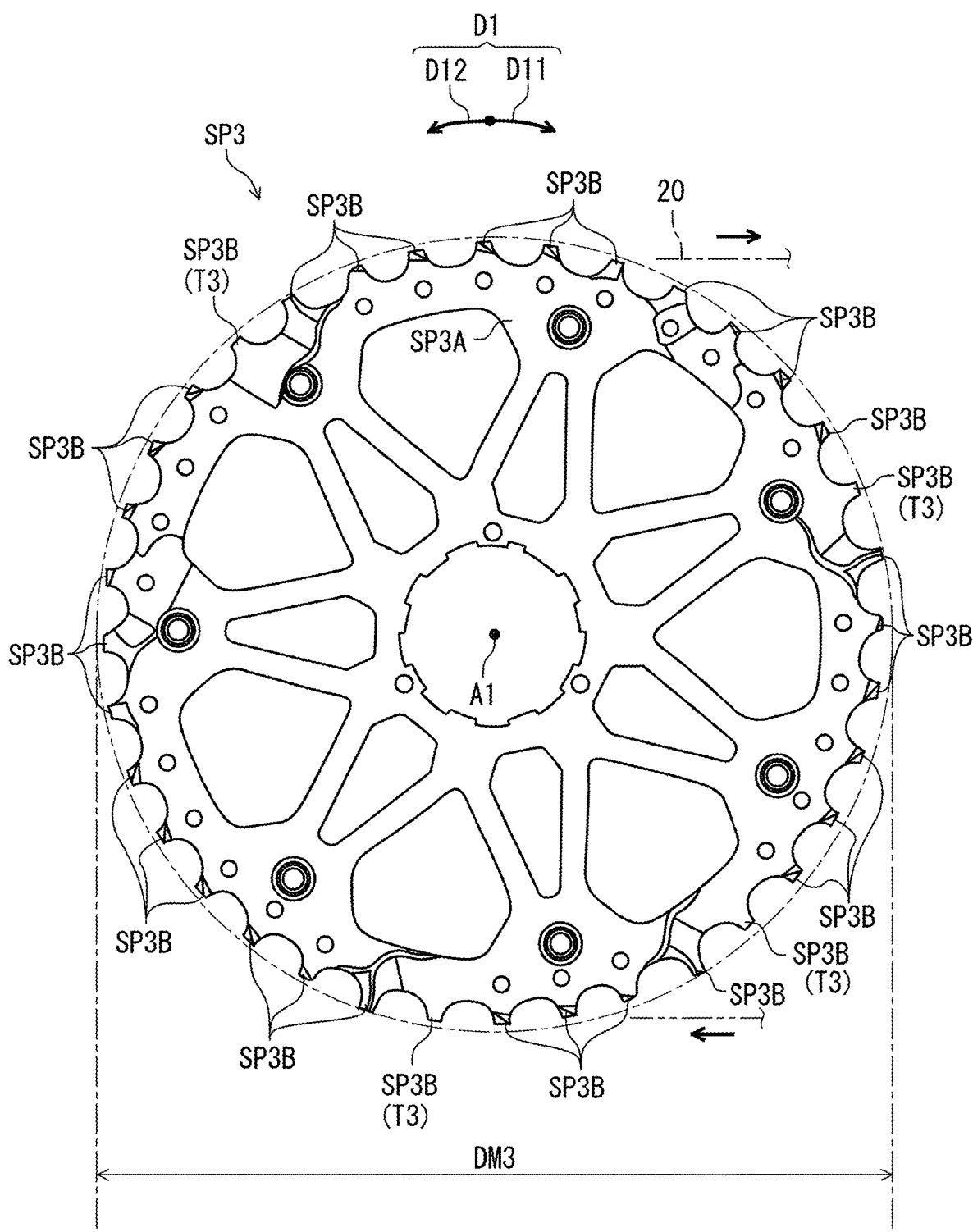

As seen in FIG. 6, the bicycle sprocket SP3 includes a sprocket body SP3A and a plurality of sprocket teeth SP3B. The plurality of sprocket teeth SP3B extends radially outwardly from the sprocket body SP3A. The plurality of sprocket teeth SP3B is disposed on an outer periphery of the sprocket body SP3A. The plurality of sprocket teeth SP3B defines a maximum tooth-tip diameter DM3. The sprocket body SP3A can also be referred to as a first or second sprocket body SP3A. The plurality of sprocket teeth SP3B can also be referred to as a plurality of first or second sprocket teeth SP3B.

Figure 7:
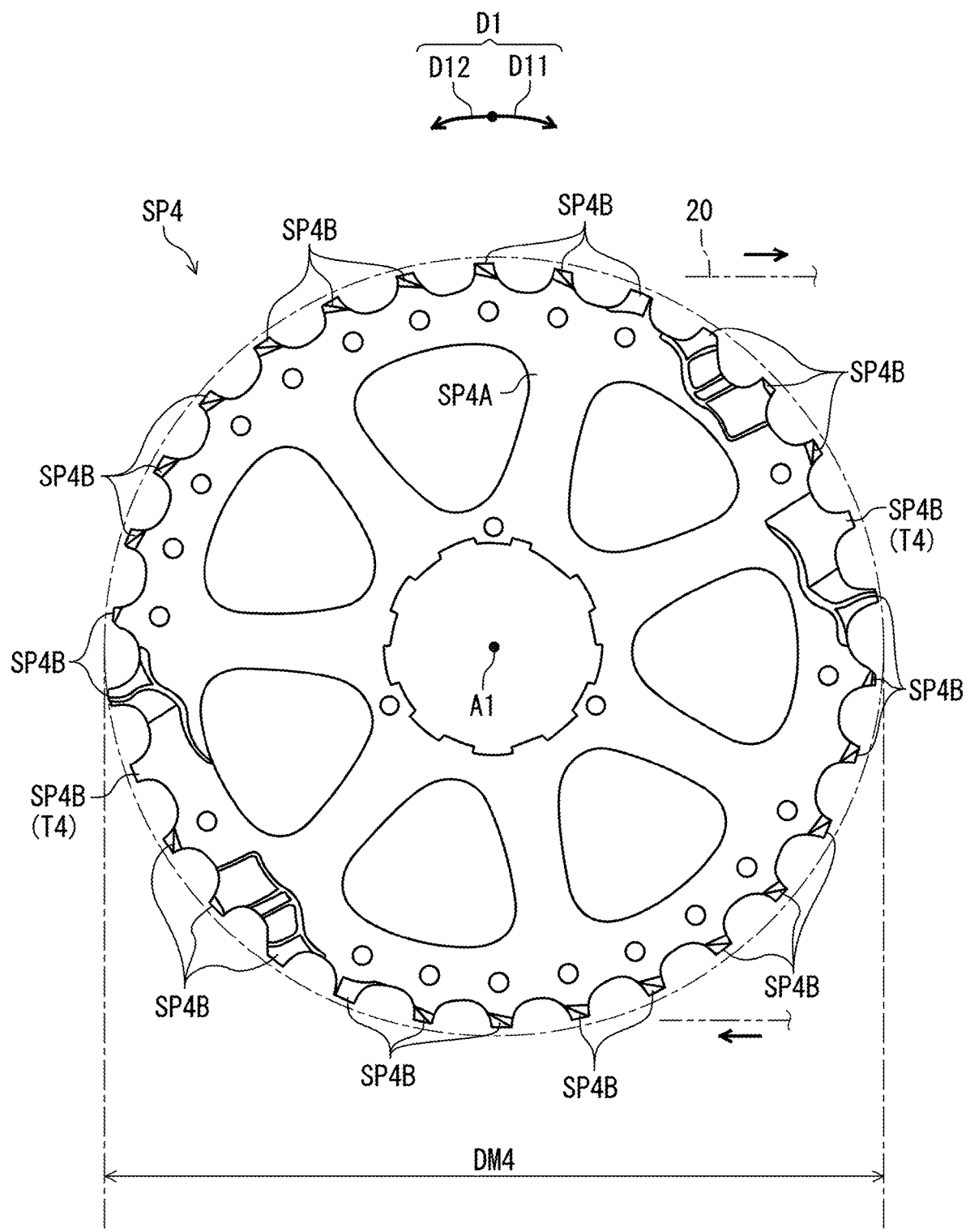

As seen in FIG. 7, the bicycle sprocket SP4 includes a sprocket body SP4A and a plurality of sprocket teeth SP4B. The plurality of sprocket teeth SP4B extends radially outwardly from the sprocket body SP4A. The plurality of sprocket teeth SP4B is disposed on an outer periphery of the sprocket body SP4A. The plurality of sprocket teeth SP4B defines a maximum tooth-tip diameter DM4. The sprocket body SP4A can also be referred to as a first or second sprocket body SP4A. The plurality of sprocket teeth SP4B can also be referred to as a plurality of first or second sprocket teeth SP4B.

Figure 8:
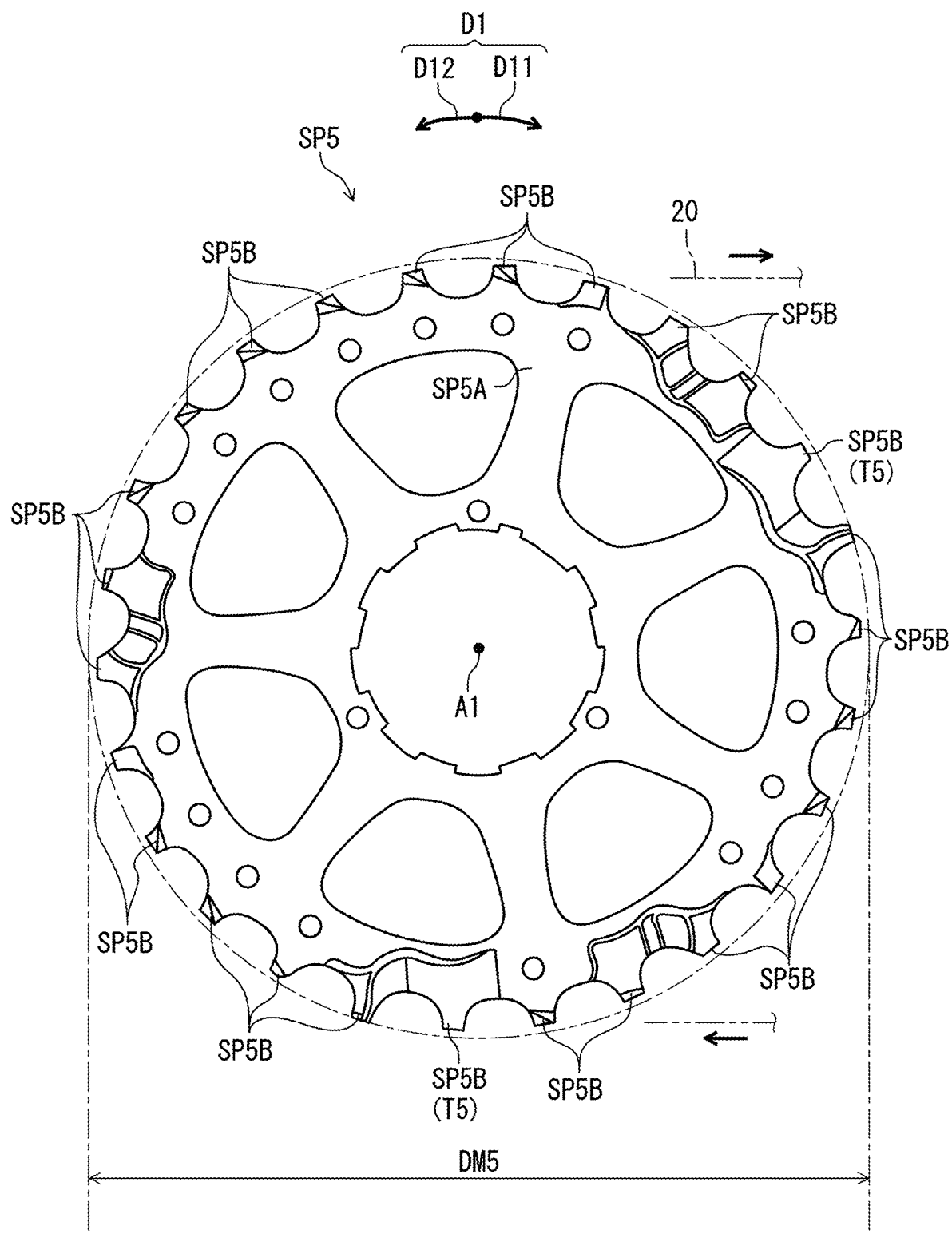

As seen in FIG. 8, the bicycle sprocket SP5 includes a sprocket body SP5A and a plurality of sprocket teeth SP5B. The plurality of sprocket teeth SP5B extends radially outwardly from the sprocket body SP5A. The plurality of sprocket teeth SP5B is disposed on an outer periphery of the sprocket body SP5A. The plurality of sprocket teeth SP5B defines a maximum tooth-tip diameter DM5. The sprocket body SP5A can also be referred to as a first or second sprocket body SP5A. The plurality of sprocket teeth SP5B can also be referred to as a plurality of first or second sprocket teeth SP5B.

Figure 9:
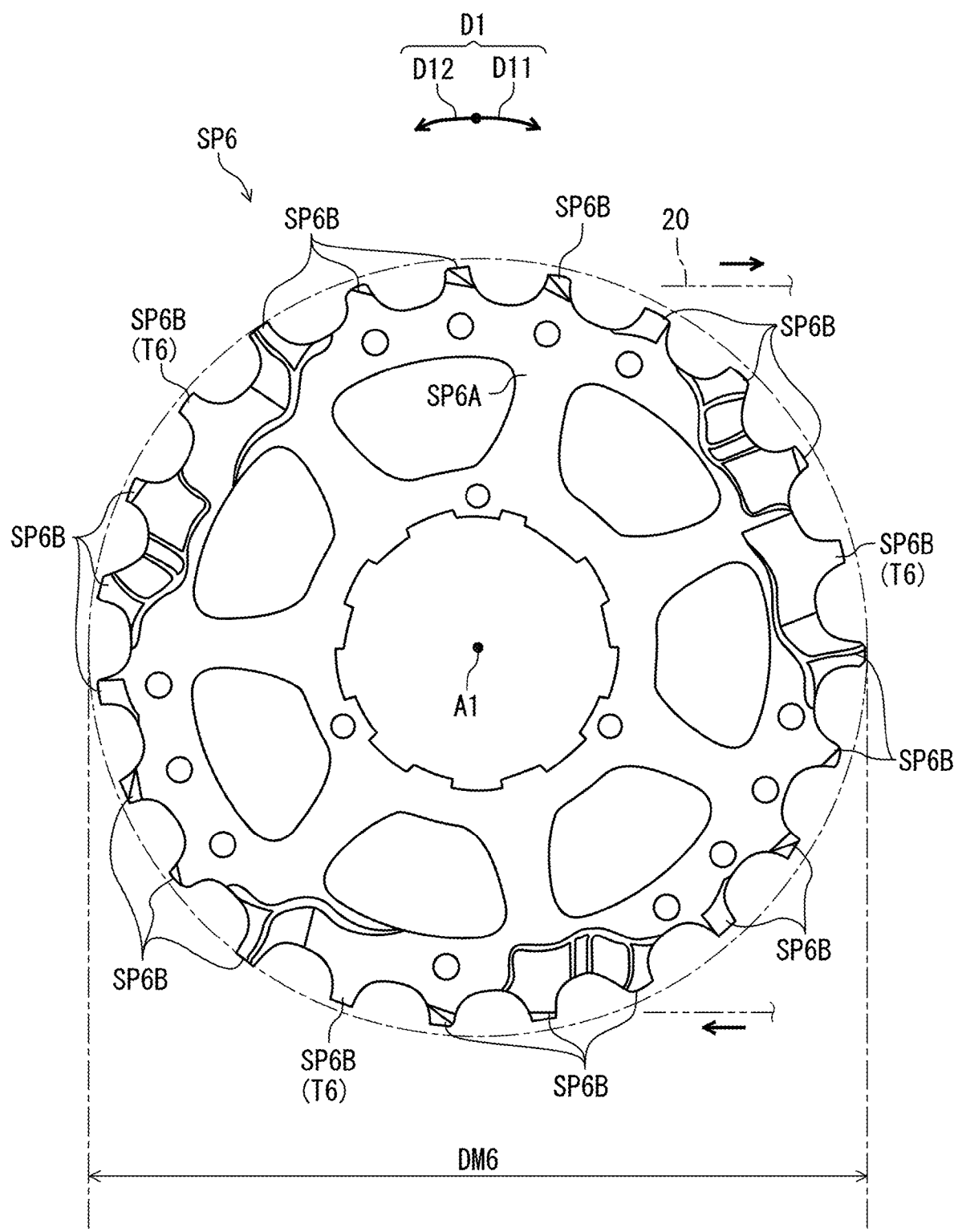

As seen in FIG. 9, the bicycle sprocket SP6 includes a sprocket body SP6A and a plurality of sprocket teeth SP6B. The plurality of sprocket teeth SP6B extends radially outwardly from the sprocket body SP6A. The plurality of sprocket teeth SP6B is disposed on an outer periphery of the sprocket body SP6A. The plurality of sprocket teeth SP6B defines a maximum tooth-tip diameter DM6. The sprocket body SP6A can also be referred to as a first or second sprocket body SP6A. The plurality of sprocket teeth SP6B can also be referred to as a plurality of first or second sprocket teeth SP6B.

Figure 10:
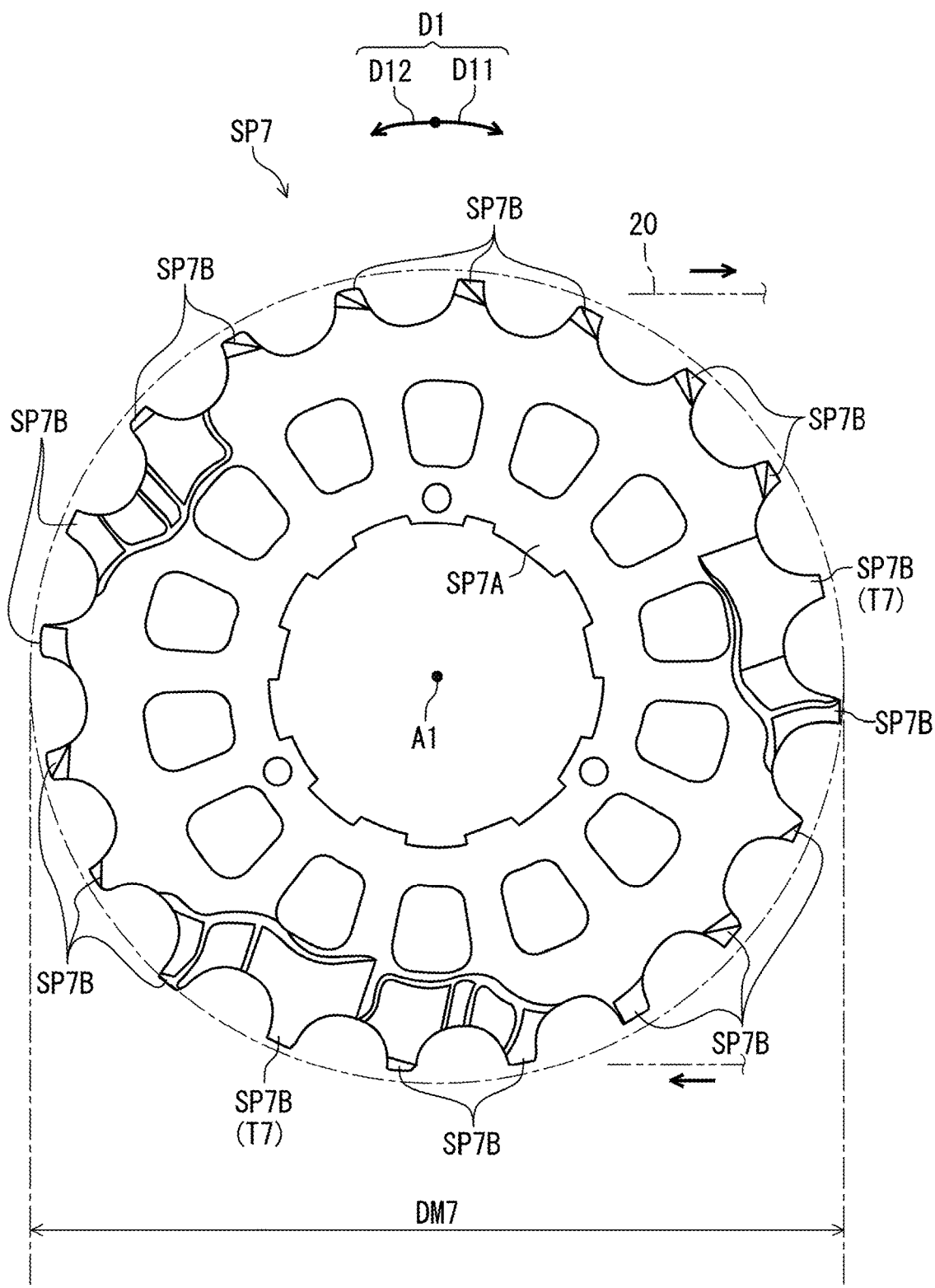

As seen in FIG. 10, the bicycle sprocket SP7 includes a sprocket body SP7A and a plurality of sprocket teeth SP7B. The plurality of sprocket teeth SP7B extends radially outwardly from the sprocket body SP7A. The plurality of sprocket teeth SP7B is disposed on an outer periphery of the sprocket body SP7A. The plurality of sprocket teeth SP7B defines a maximum tooth-tip diameter DM7. The sprocket body SP7A can also be referred to as a first or second sprocket body SP7A. The plurality of sprocket teeth SP7B can also be referred to as a plurality of first or second sprocket teeth SP7B.

As seen in FIGS. 2 and 4 to 10, the maximum tooth-tip diameter DM1 is larger than each of the maximum tooth-tip diameters DM2 to DM7. The maximum tooth-tip diameter DM2 is larger than each of the maximum tooth-tip diameters DM3 to DM7. The maximum tooth-tip diameter DM3 is larger than each of the maximum tooth-tip diameters DM4 to DM7. The maximum tooth-tip diameter DM4 is larger than each of the maximum tooth-tip diameters DM5 to DM7. The maximum tooth-tip diameter DM5 is larger than each of the maximum tooth-tip diameters DM6 and DM7. The maximum tooth-tip diameter DM6 is larger than the maximum tooth-tip diameter DM7.

Figure 11:
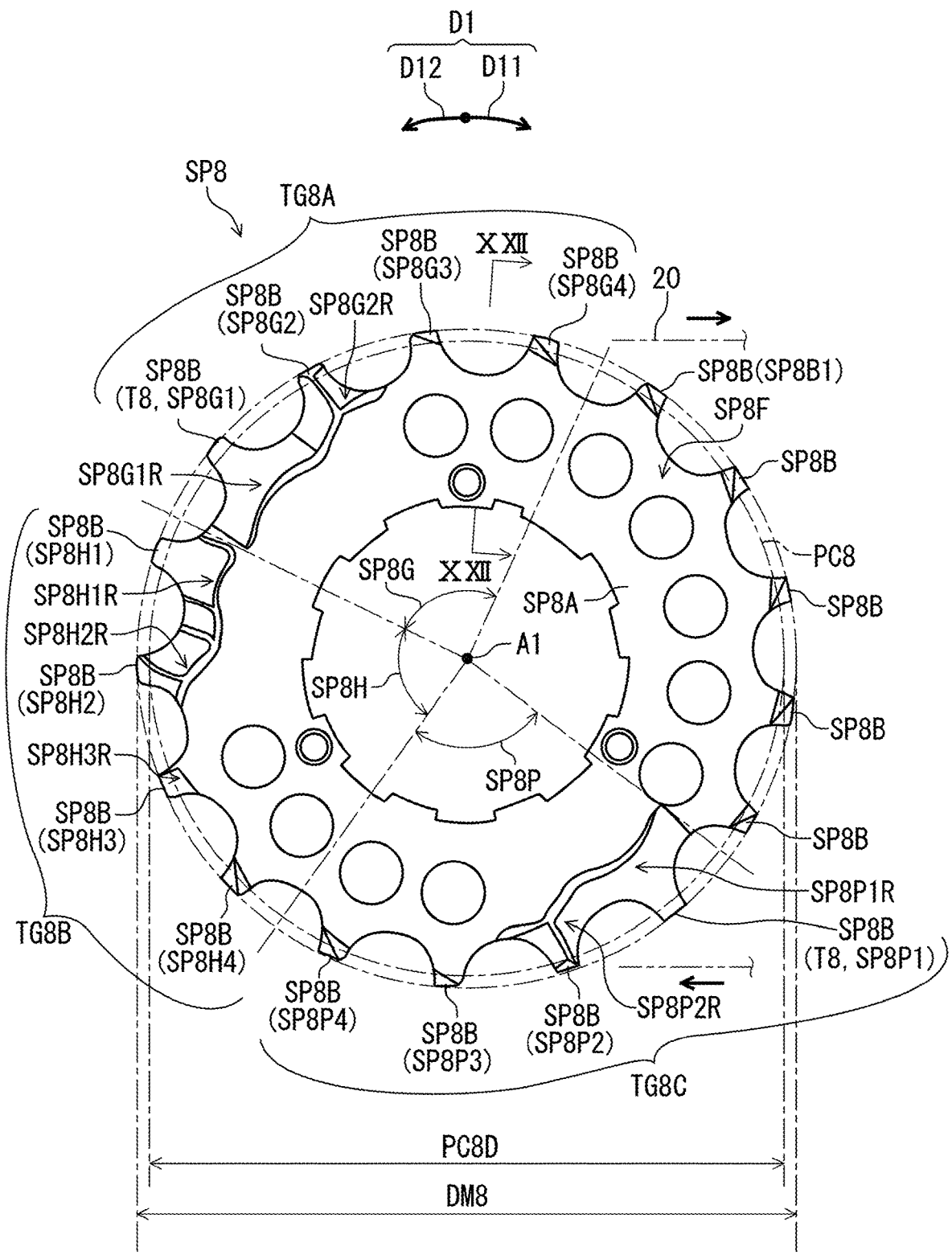

As seen in FIG. 11, the first sprocket SP8 includes a first sprocket body SP8A and a plurality of first sprocket teeth SP8B. The plurality of first sprocket teeth SP8B extends radially outwardly from the first sprocket body SP8A. The plurality of first sprocket teeth SP8B is disposed on an outer periphery of the first sprocket body SP8A. The plurality of first sprocket teeth SP8B defines a first maximum tooth-tip diameter DM8. The first maximum tooth-tip diameter DM8 is smaller than each of the maximum tooth-tip diameters DM1 to DM7 (see, e.g., FIGS. 4 to 10).

The first sprocket body SP8A can also be referred to as a sprocket body SP8A. The first sprocket tooth SP8B can also be referred to as a sprocket tooth SP8B. Thus, the bicycle sprocket SP8 comprises the sprocket body SP8A and the plurality of sprocket teeth SP8B. The plurality of sprocket teeth SP8B extends radially outwardly from the sprocket body SP8A. The plurality of sprocket teeth SP8B is disposed on an outer periphery of the sprocket body SP8A.

The bicycle sprocket SP8 has a pitch circle PC8. The pitch circle PC8 is defined by centers of rollers of the bicycle chain 20 which are in contact with the plurality of sprocket teeth SP8B during pedaling as viewed along the rotational center axis A1. The pitch circle PC8 has a pitch circle diameter PC8D.

Figure 12:
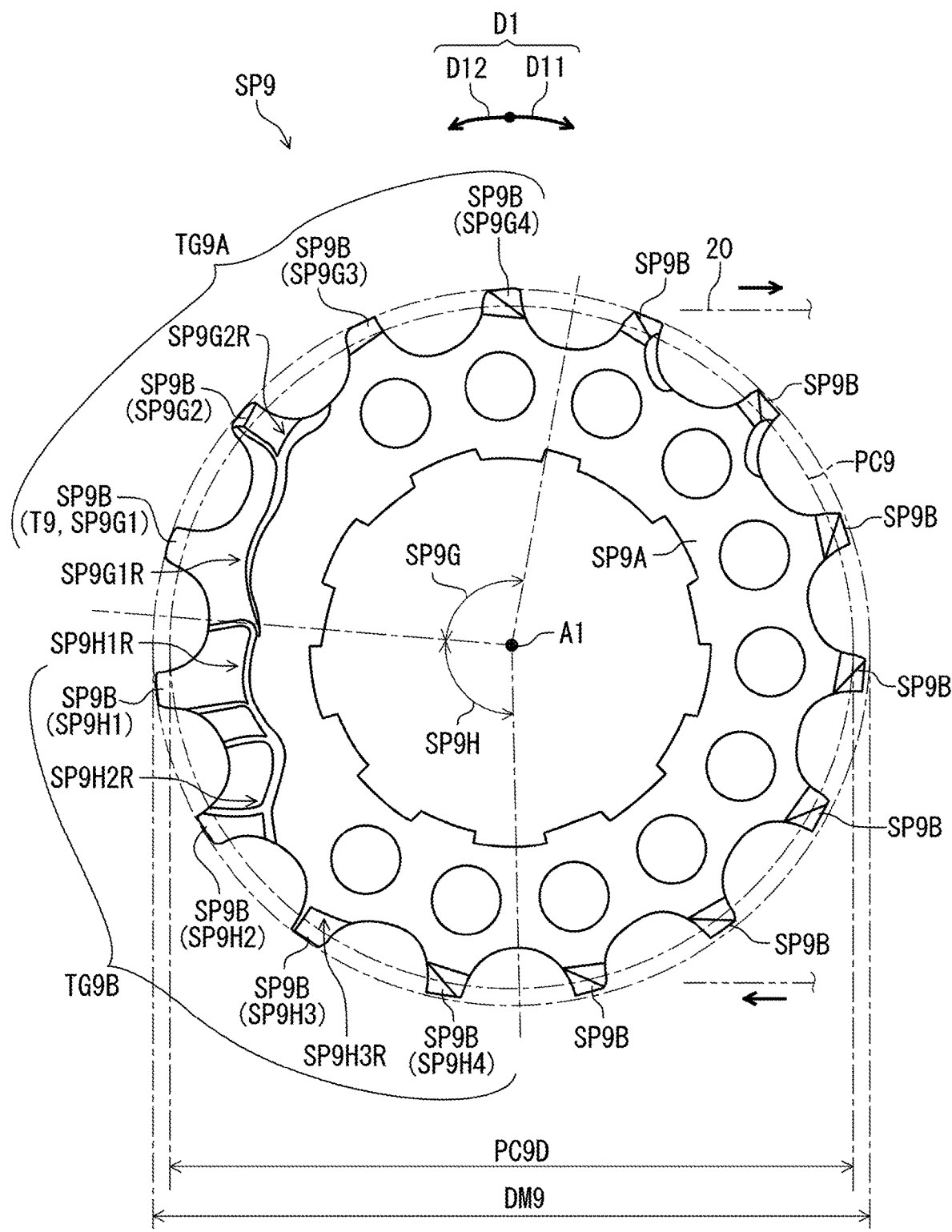

As seen in FIG. 12, the second sprocket SP9 includes a second sprocket body SP9A and a plurality of second sprocket teeth SP9B. The plurality of second sprocket teeth SP9B extends radially outwardly from the second sprocket body SP9A. The plurality of second sprocket teeth SP9B is disposed on an outer periphery of the second sprocket body SP9A. The plurality of second sprocket teeth SP9B defines a second maximum tooth-tip diameter DM9.

The second sprocket body SP9A can also be referred to as a sprocket body SP9A. The second sprocket tooth SP9B can also be referred to as a sprocket tooth SP9B. Thus, the bicycle sprocket SP9 comprises the sprocket body SP9A and the plurality of sprocket teeth SP9B. The plurality of sprocket teeth SP9B extends radially outwardly from the sprocket body SP9A. The plurality of sprocket teeth SP9B is disposed on an outer periphery of the sprocket body SP9A.

The bicycle sprocket SP9 has a pitch circle PC9. The pitch circle PC9 is defined by centers of rollers of the bicycle chain 20 which are in contact with the plurality of sprocket teeth SP9B during pedaling as viewed along the rotational center axis A1. The pitch circle PC9 has a pitch circle diameter PC9D.

As seen in FIG. 12, if the bicycle sprockets SP9 and SP10 are referred to as the first sprocket SP9 and the second sprocket SP10, the first sprocket SP9 includes a first sprocket body SP9A and a plurality of first sprocket teeth SP9B. The plurality of first sprocket teeth SP9B is disposed on an outer periphery of the first sprocket body SP9A. The plurality of first sprocket teeth SP9B defines a first maximum tooth-tip diameter DM9.

Figure 13:
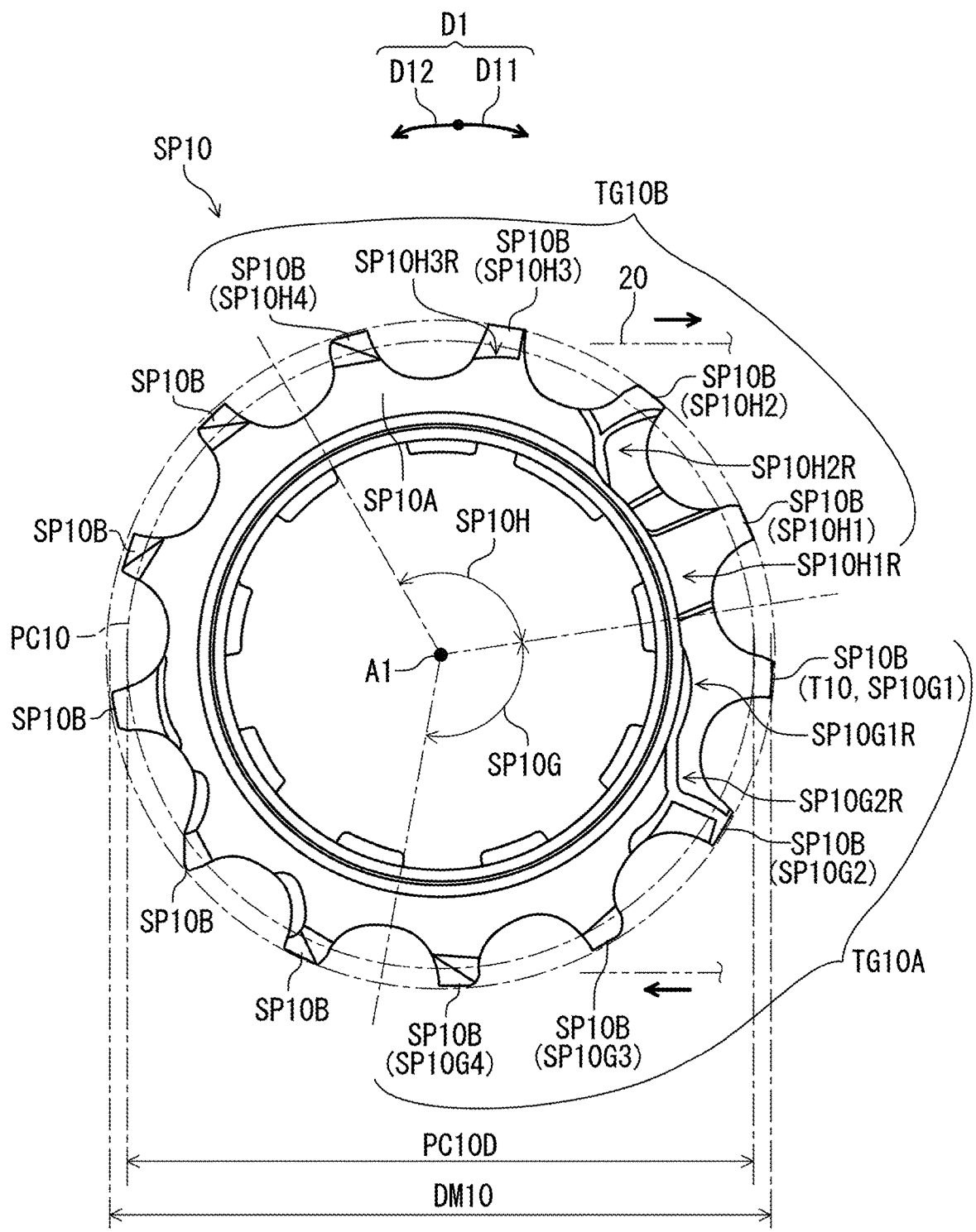

As seen in FIG. 13, if the bicycle sprockets SP9 and SP10 are referred to as the first sprocket SP9 and the second sprocket SP10, the second sprocket SP10 includes a second sprocket body SP10A and a plurality of second sprocket teeth SP10B. The plurality of second sprocket teeth SP10B extends radially outwardly from the second sprocket body SP10A. The plurality of second sprocket teeth SP10B is disposed on an outer periphery of the second sprocket body SP10A. The plurality of second sprocket teeth SP10B defines a second maximum tooth-tip diameter DM10.

The second sprocket body SP can also be referred to as a sprocket body SP10A. The second sprocket tooth SP10B can also be referred to as a sprocket tooth SP10B. Thus, the bicycle sprocket SP10 comprises the sprocket body SP10A and the plurality of sprocket teeth SP10B. The plurality of sprocket teeth SP10B extends radially outwardly from the sprocket body SP10A. The plurality of sprocket teeth SP10B is disposed on an outer periphery of the sprocket body SP10A.

The bicycle sprocket SP10 has a pitch circle PC10. The pitch circle PC10 is defined by centers of rollers of the bicycle chain 20 which are in contact with the plurality of sprocket teeth SP8B during pedaling as viewed along the rotational center axis A1. The pitch circle PC10 has a pitch circle diameter PC10D.

Figure 14:
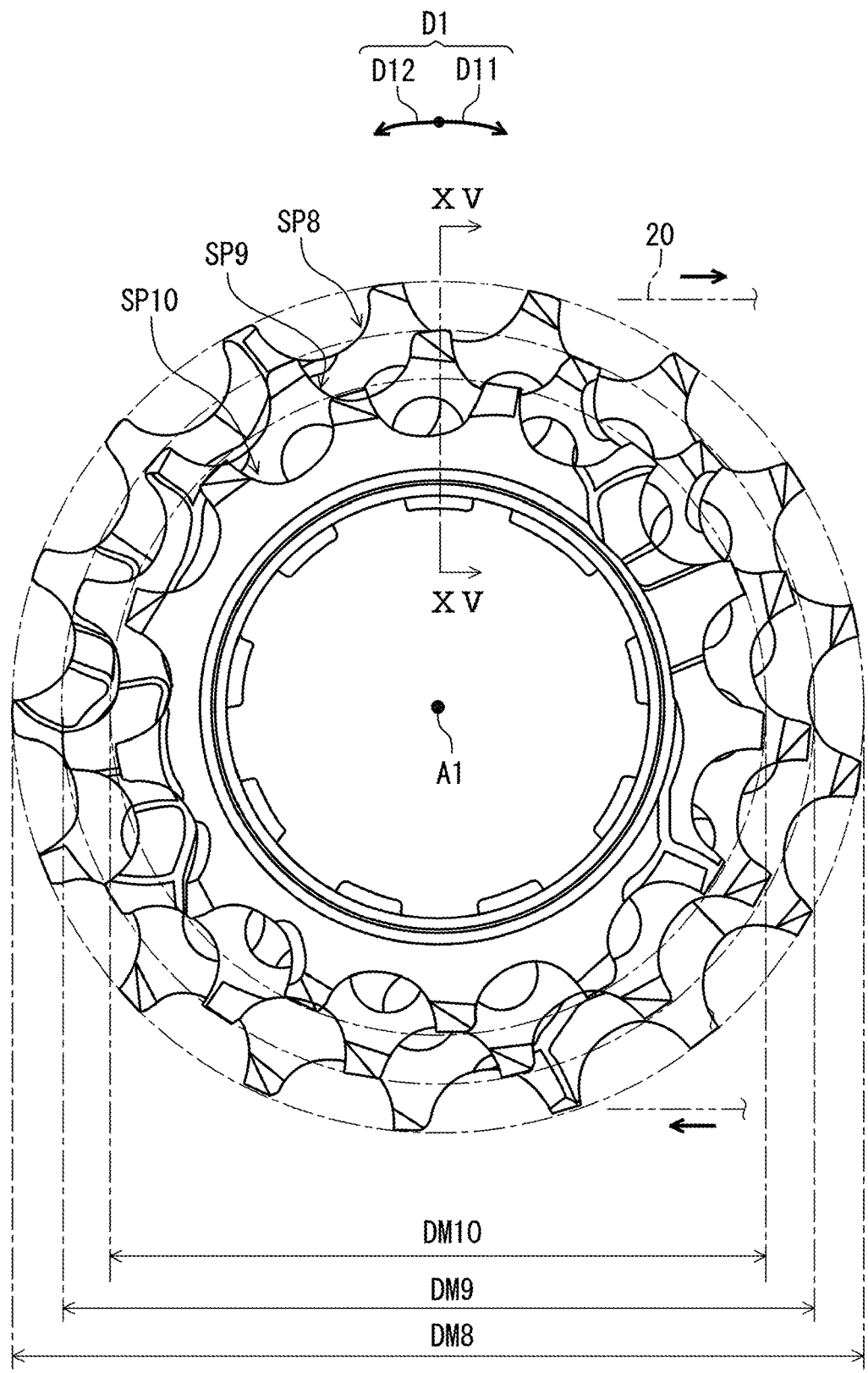
FIG. 14 is a side elevational view of the bicycle sprockets illustrated in FIGS. 11 to 13.

As seen in FIG. 14, the second maximum tooth-tip diameter DM9 is smaller than the first maximum tooth-tip diameter DM8. The second maximum tooth-tip diameter DM10 is smaller than the first maximum tooth-tip diameter DM9. A total number of the sprocket teeth SP8B is 17. A total number of the sprocket teeth SP9B is 15. A total number of the sprocket teeth SP10B is 13. However, the total number of the sprocket teeth SP8B is not limited to 17. The total number of the sprocket teeth SP9B is not limited to 15. The total number of the sprocket teeth SP10B is not limited to 13.

Figure 15:
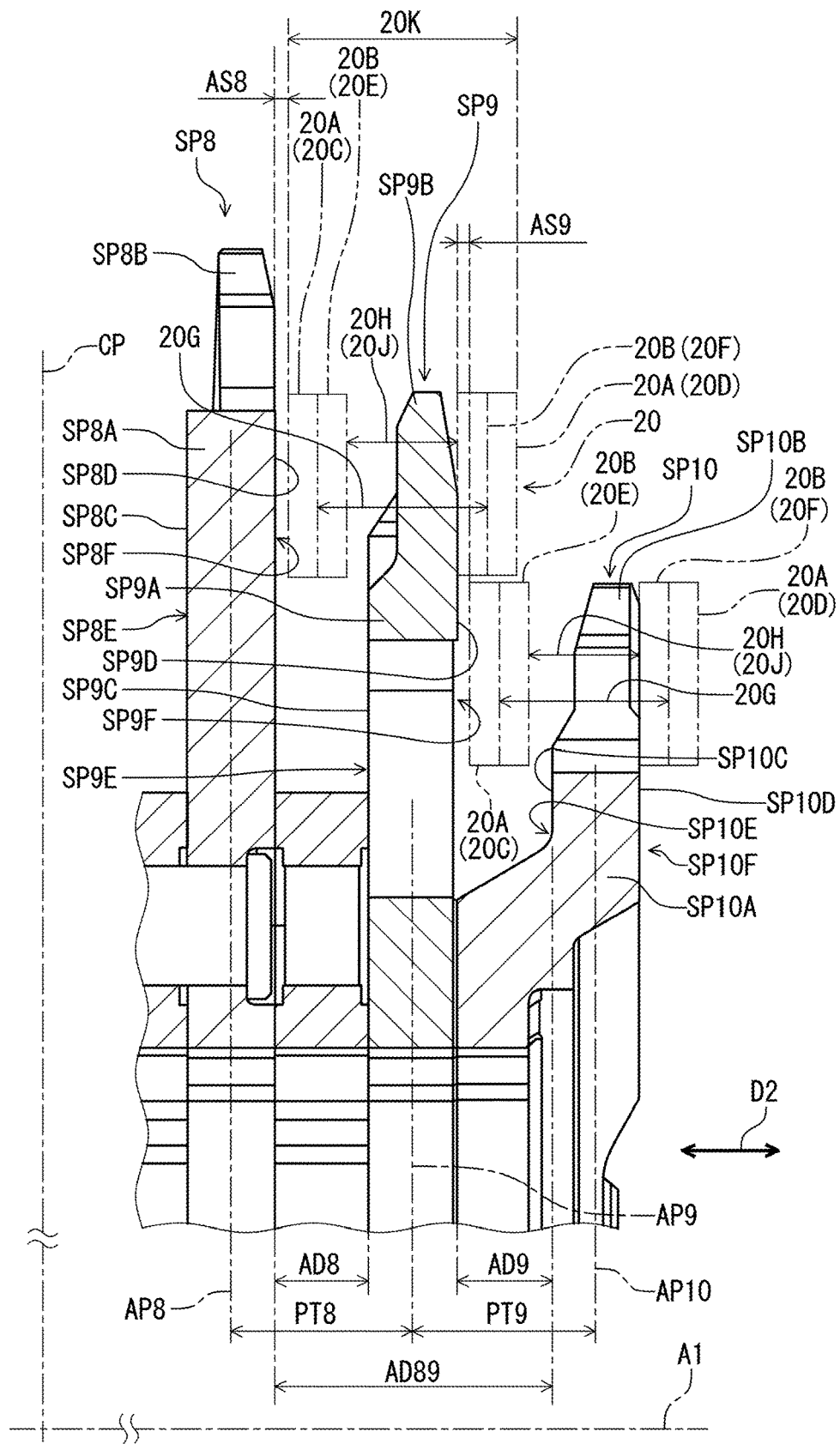
FIG. 15 is a cross-sectional view of the bicycle sprocket assembly taken along line XV-XV of FIG. 14.

As seen in FIG. 15, the first sprocket SP8 includes a first sprocket inward surface SP8C and a first sprocket outward surface SP8D. The first sprocket inward surface SP8C is configured to face toward the axial center plane CP of the bicycle 2 in a mounting state where the bicycle sprocket assembly 14 is mounted to the bicycle 2 (see, e.g., FIG. 1). The first sprocket outward surface SP8D is provided on a reverse side of the first sprocket inward surface SP8C in the axial direction D2 with respect to the rotational center axis A1 of the bicycle sprocket SP8.

The bicycle sprocket SP8 comprises a sprocket inward side SP8E and a sprocket outward side SP8F. The sprocket inward side SP8E is configured to be closer to the axial center plane CP of the bicycle 2 than the sprocket outward side SP8F in the mounting state where the bicycle sprocket SP8 is mounted to the bicycle 2. The sprocket outward side SP8F is provided on a reverse side of the sprocket inward side SP8E in the axial direction D2 with respect to the rotational center axis A1 of the bicycle sprocket SP8. The first sprocket inward surface SP8C is provided on the sprocket inward side SP8E. The first sprocket outward surface SP8D is provided on the sprocket outward side SP8F.

The second sprocket SP9 is adjacent to the first sprocket SP8 without another sprocket therebetween in the axial direction D2. The second sprocket SP9 includes a second sprocket inward surface SP9C and a second sprocket outward surface SP9D. The second sprocket inward surface SP9C is configured to face toward the axial center plane CP of the bicycle in the mounting state. The second sprocket outward surface SP9D is provided on a reverse side of the second sprocket inward surface SP9C in the axial direction D2.

The bicycle sprocket SP9 comprises a sprocket inward side SP9E and a sprocket outward side SP9F. The sprocket inward side SP9E is configured to be closer to the axial center plane CP of the bicycle 2 than the sprocket outward side SP9F in the mounting state where the bicycle sprocket SP9 is mounted to the bicycle 2. The sprocket outward side SP9F is provided on a reverse side of the sprocket inward side SP9E in the axial direction D2 with respect to the rotational center axis A1 of the bicycle sprocket SP9. The second sprocket inward surface SP9C is provided on the sprocket inward side SP9E. The second sprocket outward surface SP9D is provided on the sprocket outward side SP9F.

If the bicycle sprockets SP9 and SP10 are referred to as the first sprocket SP9 and SP10, the first sprocket SP9 includes a first sprocket inward surface SP9C and a first sprocket outward surface SP9D. The first sprocket inward surface SP9C is configured to face toward the axial center plane CP of the bicycle 2 in a mounting state where the bicycle sprocket assembly 14 is mounted to the bicycle 2 (see, e.g., FIG. 1). The first sprocket outward surface SP9D is provided on a reverse side of the first sprocket inward surface SP9C in the axial direction D2 with respect to the rotational center axis A1 of the bicycle sprocket SP9.

The second sprocket SP10 is adjacent to the first sprocket SP9 without another sprocket therebetween in the axial direction D2. The second sprocket SP10 includes a second sprocket inward surface SP10C and a second sprocket outward surface SP10D. The second sprocket inward surface SP10C is configured to face toward the axial center plane CP of the bicycle 2 in the mounting state. The second sprocket outward surface SP is provided on a reverse side of the second sprocket inward surface SP10C in the axial direction D2.

The bicycle sprocket SP10 comprises a sprocket inward side SP10E and a sprocket outward side SP10F. The sprocket inward side SP10E is configured to be closer to the axial center plane CP of the bicycle 2 than the sprocket outward side SP10F in the mounting state where the bicycle sprocket SP10 is mounted to the bicycle 2. The sprocket outward side SP10F is provided on a reverse side of the sprocket inward side SP10E in the axial direction D2 with respect to the rotational center axis A1 of the bicycle sprocket SP10. The second sprocket inward surface SP10C is provided on the sprocket inward side SP10E. The second sprocket outward surface SP10D is provided on the sprocket outward side SP10F.

The bicycle chain 20 includes a pair of opposed outer link plates 20A and a pair of opposed inner link plates 20B. The pair of opposed outer link plates 20A includes an axially inward outer link plate 20C and an axially outward outer link plate 20D. The pair of opposed outer link plates 20A includes an axially inward inner link plate 20E and an axially outward inner link plate 20F. The axially inward outer link plate 20C and the axially outward outer link plate 20D of the pair of opposed outer link plates 20A are spaced apart from each other in the axial direction D2 in an assembled state of the bicycle chain 20. The axially inward inner link plate 20E and the axially outward inner link plate 20F of the pair of opposed inner link plates 20B are spaced apart from each other in the axial direction D2 in the assembled state of the bicycle chain 20.

Each of the plurality of sprocket teeth SP8B is configured to enter each of an outer-link space 20G defined between the pair of opposed outer link plates 20A of the bicycle chain 20 and an inner-link space 20H defined between the pair of opposed inner link plates 20B of the bicycle chain 20. Each of the plurality of sprocket teeth SP9B is configured to enter each of the outer-link space 20G and the inner-link space 20I1. Each of the plurality of sprocket teeth SP10B is configured to enter each of the outer-link space 20G and the inner-link space 20I1.

In the present embodiment, an axial length 20J of the inner-link space 20H is equal to or larger than 2.32 mm. The bicycle chain 20 has an outer distance 20K defined between axial outer surfaces of the opposed outer link plates 20A in the axial direction D2. The outer distance 20K of the bicycle chain 20 is 5.62 mm. However, each of the axial length 20J of the inner-link space 20H and the outer distance 20K is not limited to the above values.

The first sprocket SP8 includes an axial space AS8. The axial space AS8 is defined between the first sprocket outward surface SP8D of one of the plurality of first sprocket teeth SP8B and the axially inward outer link plate 20C of the pair of opposed outer link plates 20A of the bicycle chain 20 in the axial direction D2 while the second sprocket outward surface SP9D of one of the plurality of second sprocket teeth SP9B contacts the axially outward inner link plate 20F of the pair of opposed inner link plates 20B of the bicycle chain 20 in an engagement state where the one of the plurality of the second sprocket teeth SP9B is positioned between the axially inward inner link plate 20E and the axially outward inner link plate 20F of the pair of opposed inner link plates 20B in the axial direction D2. In the present embodiment, the axial space AS8 is larger than 0 mm and equal to or smaller than 0.15 mm. In the present embodiment, the axial space AS8 is 0.08 mm. However, the axial space AS8 is not limited to the present embodiment and the above range. The value and range of the axial space AS8 can be applied to other first and second sprockets in the plurality of bicycle sprockets SP.

The first sprocket SP9 includes an axial space AS9. The axial space AS9 is defined between the first sprocket outward surface SP9D of one of the plurality of first sprocket teeth SP9B and the axially inward outer link plate 20C of the pair of opposed outer link plates 20A of the bicycle chain 20 in the axial direction D2 while the second sprocket outward surface SP10C of one of the plurality of second sprocket teeth SP10B contacts the axially outward inner link plate 20F of the pair of opposed inner link plates 20B of the bicycle chain 20 in an engagement state where the one of the plurality of the second sprocket teeth SP10B is positioned between the axially inward inner link plate 20E and the axially outward inner link plate 20F of the pair of opposed inner link plates 20B in the axial direction D2. In the present embodiment, the axial space AS9 is larger than 0 mm and equal to or smaller than 0.15 mm. In the present embodiment, the axial space AS9 is 0.08 mm. However, the axial space AS9 is not limited to the above value and the above range. The value and range of the axial space AS8 can be applied to other first and second sprockets in the plurality of bicycle sprockets SP.

An axial distance AD8 is defined between the sprocket outward surface SP8D of the bicycle sprocket SP8 and the sprocket inward surface SP9C of the bicycle sprocket SP9 in the axial direction D2. An axial distance AD9 is defined between the sprocket outward surface SP9D of the bicycle sprocket SP9 and the sprocket inward surface SP10C of the bicycle sprocket SP10 in the axial direction D2. An additional axial distance AD89 is defined between the sprocket outward surface SP8D of the bicycle sprocket SP8 and the sprocket inward surface SP10C of the bicycle sprocket SP10 in the axial direction D2. An axial sprocket pitch PT8 is defined between an axial center plane AP8 of the bicycle sprocket SP8 and an axial center plane AP9 of the bicycle sprocket SP9 in the axial direction D2. An axial sprocket pitch PT9 is defined between the axial center plane AP9 of the bicycle sprocket SP9 and an axial center plane AP10 of the bicycle sprocket SP10 in the axial direction D2.

The axial center plane AP8 of the bicycle sprocket SP8 is defined to bisect an axial width of the sprocket body SP8A of the bicycle sprocket SP8 in the axial direction D2 and is perpendicular to the axial direction D2. The axial center plane AP9 of the bicycle sprocket SP9 is defined to bisect an axial width of the sprocket body SP9A of the bicycle sprocket SP9 in the axial direction D2 and is perpendicular to the axial direction D2. The axial center plane AP10 of the bicycle sprocket SP9 is defined to bisect an axial width of the sprocket body SP10A of the bicycle sprocket SP10 in the axial direction D2 and is perpendicular to the axial direction D2.

In the present embodiment, the axial distance AD8 is 2.1 mm. The axial distance AD9 is 2.1 mm. The additional axial distance AD89 is 6.15 mm. The axial sprocket pitch PT8 is 4.05 mm. A difference between the additional axial distance AD89 and the outer distance 20K of the bicycle chain 20 is 0.53 mm. However, the axial distance AD8, the axial distance AD9, the axial sprocket pitch PT8, and the difference between the additional axial distance AD89 and the outer distance 20K are not limited to the above values. The values of the axial distance AD8, the axial distance AD9, the axial sprocket pitch PT8, and the difference between the additional axial distance AD89 and the outer distance 20K can be applied to other sprockets in the plurality of bicycle sprockets SP.

As seen in FIG. 11, the bicycle sprocket SP8 further comprises an upshifting facilitation section SP8G and a downshifting facilitation section SP8H. The first sprocket SP8 includes the upshifting facilitation section SP8G. The first sprocket SP8 includes a downshifting facilitation section SP8H.

The upshifting facilitation section SP8G is configured to facilitate an upshifting operation where the bicycle chain 20 shifts from the first sprocket SP8 toward the second sprocket SP9 (see, e.g., FIG. 15). The upshifting facilitation section SP8G is intentionally designed to facilitate the upshifting operation where the bicycle chain 20 shifts from the first sprocket SP8 toward the second sprocket SP9. The second sprocket SP9 can also be referred to as a smaller sprocket SP9. Thus, the upshifting facilitation section SP8G is configured to facilitate the upshifting operation where the bicycle chain 20 shifts from the bicycle sprocket SP8 toward the smaller sprocket SP9 (see, e.g., FIG. 15) adjacent to the bicycle sprocket SP8 without another sprocket therebetween in the axial direction D2 with respect to the rotational center axis A1 of the bicycle sprocket SP8. The upshifting facilitation section SP8G is intentionally designed to facilitate the upshifting operation where the bicycle chain 20 shifts from the bicycle sprocket SP8 toward the smaller sprocket SP9.

The downshifting facilitation section SP8H is configured to facilitate a downshifting operation where the bicycle chain 20 shifts from the second sprocket SP9 (see, e.g., FIG. 15) toward the first sprocket SP8. The downshifting facilitation section SP8H is intentionally designed to facilitate the downshifting operation where the bicycle chain 20 shifts from the second sprocket SP9 toward the first sprocket SP8. Thus, the downshifting facilitation section SP8H is configured to facilitate the downshifting operation where the bicycle chain 20 shifts from the smaller sprocket SP9 (see, e.g., FIG. 15) toward the bicycle sprocket SP8. The downshifting facilitation section SP8H is intentionally designed to facilitate the downshifting operation where the bicycle chain 20 shifts from the smaller sprocket SP9 toward the bicycle sprocket SP8.

The downshifting facilitation section SP8H is disposed on an upstream side of the upshifting facilitation section SP8G in the circumferential direction D1. The downshifting facilitation section SP8H is disposed on an upstream side of the upshifting facilitation section SP8G in the circumferential direction D1 with respect to the rotational center axis A1 of the bicycle sprocket and with respect to the driving rotational direction D11. The downshifting facilitation section SP8H is disposed on an upstream side of the upshifting facilitation section SP8G in the driving rotational direction D1l without another shifting facilitation section between the upshifting facilitation section SP8G and the downshifting facilitation section SP8H.

The upshifting facilitation section SP8G is formed by a first tooth group TG8A in the plurality of sprocket teeth SP8B. The downshifting facilitation section SP8H is formed by a second tooth group TG8B in the plurality of sprocket teeth SP8B. The second tooth group TG8B is entirely different from the first tooth group TG8A. The first tooth group TG8A of the upshifting facilitation section SP8G is adjacent to the second tooth group TG8B of the downshifting facilitation section SP8H without another tooth therebetween.

The first tooth group TG8A includes upshifting teeth SP8G1 and SP8G2 and upshifting facilitation teeth SP8G3 and SP8G4. The second tooth group TG8B includes downshifting teeth SP8H1 and SP8H2 and downshifting teeth SP8H3 and SP8H4. A total number of the sprocket teeth SP8B of the second tooth group TG8B is equal to a total number of the sprocket teeth SP8B of the first tooth group TG8A. However, the total number of the sprocket teeth SP8B of the second tooth group TG8B can be different from the total number of the sprocket teeth SP8B of the first tooth group TG8A.

A total number of the sprocket teeth SP8B provided from an upstream end of the downshifting facilitation section SP8H to a downstream end of the upshifting facilitation section SP8G in the reverse rotational direction D12 is larger than a total number of the sprocket teeth SP8B provided from a downstream end of the downshifting facilitation section SP8H to an upstream end of the upshifting facilitation section SP8G in the driving rotational direction D11. In the present embodiment, the total number of the sprocket teeth SP8B provided from the upstream end of the downshifting facilitation section SP8H to the downstream end of the upshifting facilitation section SP8G in the reverse rotational direction D12 is nine. The total number of the sprocket teeth SP8B provided from the downstream end of the downshifting facilitation section SP8H to the upstream end of the upshifting facilitation section SP8G in the driving rotational direction D1*l* is zero. However, the positional relationship between the upshifting facilitation section SP8G and the downshifting facilitation section SP8H is not limited to the present embodiment.

The upshifting tooth SP8G2 is configured to initially derail the opposed inner link plates 20B of the bicycle chain 20 from the bicycle sprocket SP8 in the upshifting operation in a first state where the upshifting facilitation tooth SP8G3 is engaged in the outer-link space 20G (see, e.g., FIG. 15) of the opposed outer link plates 20A of the bicycle chain 20.

The upshifting tooth SP8G1 includes an upshifting recess SP8G1R provided on the sprocket outward side SP8F to facilitate the upshifting operation. The upshifting recess SP8G1R is configured to derail the opposed outer link plates 20A of the bicycle chain 20 in the upshifting operation after the upshifting tooth SP8G2 derails the opposed inner link plates 20B of the bicycle chain 20 from the bicycle sprocket SP8.

The upshifting tooth SP8G2 includes an upshifting recess SP8G2R provided on the sprocket outward side SP8F to facilitate the upshifting operation. The upshifting recess SP8G2R is configured to initially derail the opposed inner link plates 20B of the bicycle chain 20 in the upshifting operation.

Figure 16:
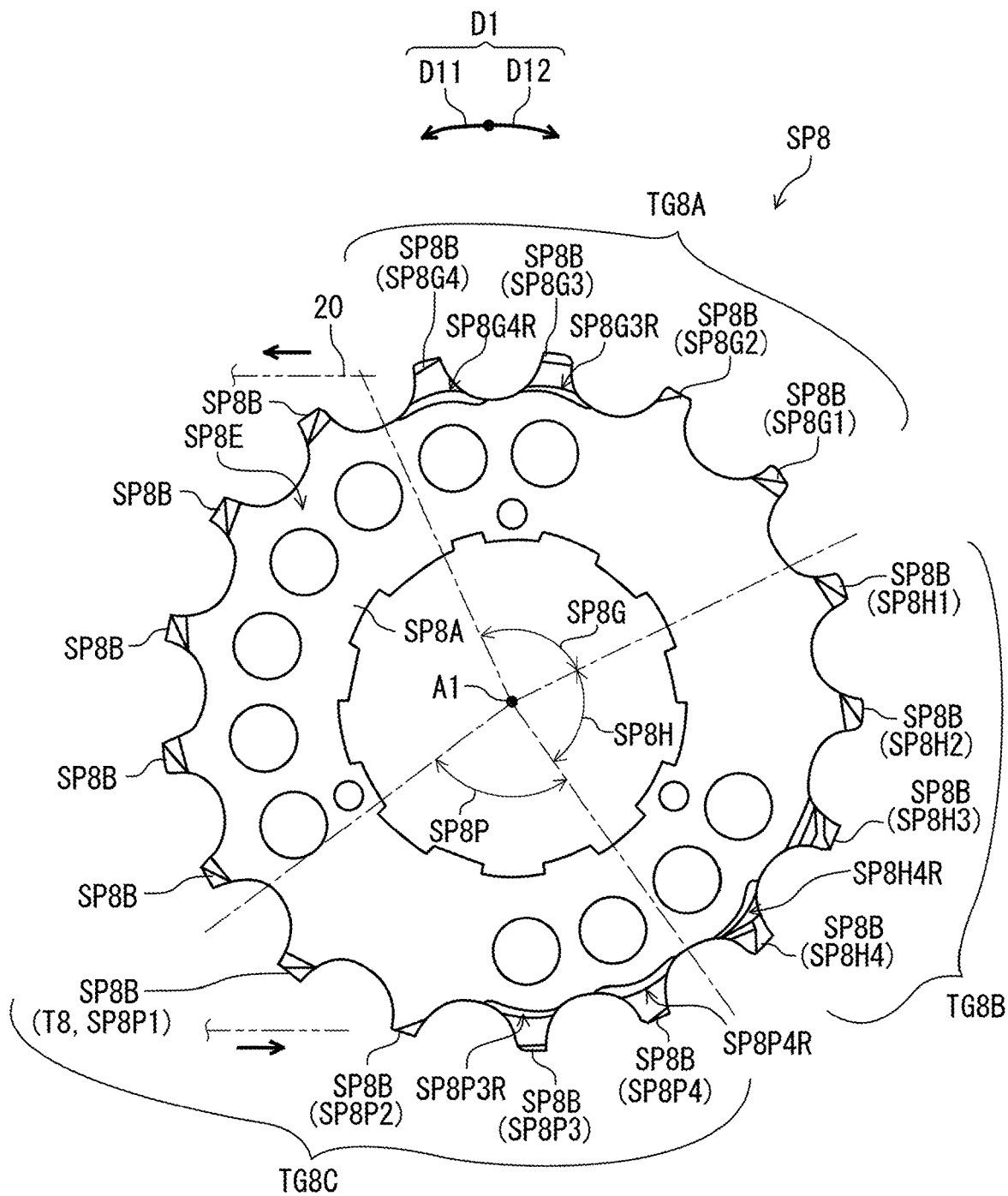
FIG. 16 is another side elevational view of the bicycle sprocket illustrated in FIG. 11.

As seen in FIG. 16, the upshifting facilitation tooth SP8G3 includes an upshifting facilitation recess SP8G3R provided on the sprocket inward side SP8E to facilitate the upshifting operation. The upshifting facilitation recess SP8G3R is configured to facilitate approaching of the bicycle chain 20 toward the smaller sprocket SP9 in the upshifting operation in a state where the bicycle chain 20 is engaged with the bicycle sprocket SP8.

The upshifting facilitation tooth SP8G4 includes an upshifting facilitation recess SP8G4R provided on the sprocket inward side SP8E to facilitate the upshifting operation. The upshifting facilitation recess SP8G4R is configured to facilitate approaching of the bicycle chain 20 toward the smaller sprocket SP9 in the upshifting operation in a state where the bicycle chain 20 is engaged with the bicycle sprocket SP8.

As seen in FIG. 11, the downshifting facilitation tooth SP8H1 includes a downshifting facilitation recess SP8H1R provided on the sprocket outward side SP8F to facilitate the downshifting operation. The downshifting facilitation recess SP8H1R is configured to reduce interference between the bicycle sprocket SP8 and the bicycle chain 20 in the downshifting operation. The downshifting facilitation recess SP8H1R is configured to facilitate approaching of the bicycle chain 20 from the smaller sprocket SP9 toward the bicycle sprocket SP8 in the downshifting operation in a state where the bicycle chain 20 is engaged with the smaller sprocket SP9.

The downshifting facilitation tooth SP8H2 includes a downshifting facilitation recess SP8H2R provided on the sprocket outward side SP8F to facilitate the downshifting operation. The downshifting facilitation recess SP8H2R is configured to reduce interference between the bicycle sprocket SP8 and the bicycle chain 20 in the downshifting operation. The downshifting facilitation recess SP8H2R is configured to facilitate approaching of the bicycle chain 20 from the smaller sprocket SP9 toward the bicycle sprocket SP8 in the downshifting operation in a state where the bicycle chain 20 is engaged with the smaller sprocket SP9.

The downshifting tooth SP8H3 includes a downshifting recess SP8H3R provided on the sprocket outward side SP8F to facilitate the downshifting operation. The downshifting recess SP8H3R is configured to facilitate engagement of the bicycle sprocket SP8 with the bicycle chain 20 in the downshifting operation.

As seen in FIG. 16, the downshifting tooth SP8H4 is configured to catch the opposed outer link plates 20A of the bicycle chain 20 in the downshifting operation if one of the opposed inner link plates 20B contacts the downshifting tooth SP8H3 during the downshifting operation. The downshifting tooth SP8H4 includes a downshifting recess SP8H4R provided on the sprocket inward side SP8E to facilitate the downshifting operation. The downshifting recess SP8H4R is configured to facilitate catching of the opposed outer link plates 20A of the bicycle chain 20 at the downshifting tooth SP8H4 in the downshifting operation.

As seen in FIG. 11, the bicycle sprocket SP8 further comprises an additional upshifting facilitation section SP8P. The additional upshifting facilitation section SP8P is configured to facilitate the upshifting operation where the bicycle chain 20 shifts from the first sprocket SP8 toward the second sprocket SP9 (see, e.g., FIG. 15). The additional upshifting facilitation section SP8P is intentionally designed to facilitate the upshifting operation where the bicycle chain 20 shifts from the first sprocket SP8 toward the second sprocket SP9. The additional upshifting facilitation section SP8P is configured to facilitate the upshifting operation where the bicycle chain 20 shifts from the bicycle sprocket SP8 toward the smaller sprocket SP9 (see, e.g., FIG. 15) adjacent to the bicycle sprocket SP8 without another sprocket therebetween in the axial direction D2 with respect to the rotational center axis A1 of the bicycle sprocket SP8. The additional upshifting facilitation section SP8P is intentionally designed to facilitate the upshifting operation where the bicycle chain 20 shifts from the bicycle sprocket SP8 toward the smaller sprocket SP9.

The additional upshifting facilitation section SP8P is formed by a third tooth group TG8C in the plurality of sprocket teeth SP8B. The first tooth group TG8A is entirely different from the third tooth group TG8C. The second tooth group TG8B is entirely different from the third tooth group TG8C. The third tooth group TG8C of the additional upshifting facilitation section SP8P is adjacent to the second tooth group TG8B of the downshifting facilitation section SP8H without another tooth therebetween.

The third tooth group TG8C includes additional upshifting teeth SP8P1 to SP8P4. The total number of the sprocket teeth SP8B of the first tooth group TG8A is equal to a total number of the sprocket teeth SP8B of the third tooth group TG8C. A total number of the sprocket teeth SP8B of the second tooth group TG8B is equal to the total number of the sprocket teeth SP8B of the third tooth group TG8C. However, the total number of the sprocket teeth SP8B of the first tooth group TG8A can be different from the total number of the sprocket teeth SP8B of the third tooth group TG8C. The total number of the sprocket teeth SP8B of the second tooth group TG8B can be different from the total number of the sprocket teeth SP8B of the third tooth group TG8C.

The upshifting facilitation tooth SP8P3 is configured to derail the opposed inner link plates 20B of the bicycle chain 20 from the bicycle sprocket SP8 in the upshifting operation in a state where the upshifting tooth SP8P4 is engaged in the outer-link space 20G (see, e.g., FIG. 15) of the opposed outer link plates 20A of the bicycle chain 20.

The upshifting tooth SP8P1 includes an upshifting recess SP8P1R provided on the sprocket outward side SP8F to facilitate the upshifting operation. The upshifting recess SP8P1R is configured to derail the opposed outer link plates 20A of the bicycle chain 20 in the upshifting operation after the upshifting facilitation tooth SP8P32 derails the opposed inner link plates 20B of the bicycle chain 20 from the bicycle sprocket SP8.

The upshifting tooth SP8P2 includes an upshifting recess SP8P2R provided on the sprocket outward side SP8F to facilitate the upshifting operation. The upshifting recess SP8P2R is configured to initially derail the opposed inner link plates 20B of the bicycle chain 20 in the upshifting operation upshifting facilitation tooth SP8P3 in a state where the upshifting facilitation tooth SP8P3 is engaged in the outer-link space 20G of the opposed outer link plates 20A of the bicycle chain 20.

As seen in FIG. 16, the upshifting facilitation tooth SP8P3 includes an upshifting facilitation recess SP8P3R provided on the sprocket inward side SP8E to facilitate the upshifting operation. The upshifting facilitation recess SP8P3R is configured to facilitate approaching of the bicycle chain 20 toward the smaller sprocket SP9 in the upshifting operation in a state where the bicycle chain 20 is engaged with the bicycle sprocket SP8.

The upshifting facilitation tooth SP8P4 includes an upshifting facilitation recess SP8P4R provided on the sprocket inward side SP8E to facilitate the upshifting operation. The upshifting recess SP8P4R is configured to facilitate approaching of the bicycle chain 20 toward the smaller sprocket SP9 in the upshifting operation in a state where the bicycle chain 20 is engaged with the bicycle sprocket SP8.

In the present embodiment, the bicycle sprocket SP8 further comprises the additional upshifting facilitation section SP8P. However, the additional upshifting facilitation section SP8P can be omitted from the bicycle sprocket SP8.

As seen in FIG. 12, the bicycle sprocket SP9 further comprises an upshifting facilitation section SP9G and a downshifting facilitation section SP9H. The first sprocket SP9 includes the upshifting facilitation section SP9G. The first sprocket SP9 includes a downshifting facilitation section SP9H.

The upshifting facilitation section SP9G is configured to facilitate an upshifting operation where the bicycle chain 20 shifts from the first sprocket SP9 toward the second sprocket SP10 (see, e.g., FIG. 15). The upshifting facilitation section SP9G is intentionally designed to facilitate the upshifting operation where the bicycle chain 20 shifts from the first sprocket SP9 toward the second sprocket SP10. The second sprocket SP10 can also be referred to as a smaller sprocket SP10. Thus, the upshifting facilitation section SP9G is configured to facilitate the upshifting operation where the bicycle chain 20 shifts from the bicycle sprocket SP9 toward the smaller sprocket SP10 (see, e.g., FIG. 15) adjacent to the bicycle sprocket SP9 without another sprocket therebetween in the axial direction D2 with respect to the rotational center axis A1 of the bicycle sprocket SP9. The upshifting facilitation section SP9G is intentionally designed to facilitate the upshifting operation where the bicycle chain 20 shifts from the bicycle sprocket SP9 toward the smaller sprocket SP10.

The downshifting facilitation section SP9H is configured to facilitate a downshifting operation where the bicycle chain 20 shifts from the second sprocket SP10 (see, e.g., FIG. 15) toward the first sprocket SP9. The downshifting facilitation section SP9H is intentionally designed to facilitate the downshifting operation where the bicycle chain 20 shifts from the second sprocket SP10 toward the first sprocket SP9. Thus, the downshifting facilitation section SP9H is configured to facilitate the downshifting operation where the bicycle chain 20 shifts from the smaller sprocket SP10 (see, e.g., FIG. 15) toward the bicycle sprocket SP9. The downshifting facilitation section SP9H is intentionally designed to facilitate the downshifting operation where the bicycle chain 20 shifts from the smaller sprocket SP10 toward the bicycle sprocket SP9.

The downshifting facilitation section SP9H is disposed on an upstream side of the upshifting facilitation section SP9G in the circumferential direction D1. The downshifting facilitation section SP9H is disposed on an upstream side of the upshifting facilitation section SP9G in the circumferential direction D1 with respect to the rotational center axis A1 of the bicycle sprocket and with respect to the driving rotational direction D11. The downshifting facilitation section SP9H is disposed on an upstream side of the upshifting facilitation section SP9G in the driving rotational direction D11 without another shifting facilitation section between the upshifting facilitation section SP9G and the downshifting facilitation section SP9H.

The upshifting facilitation section SP9G is formed by a first tooth group TG9A in the plurality of sprocket teeth SP9B. The downshifting facilitation section SP9H is formed by a second tooth group TG9B in the plurality of sprocket teeth SP9B. The second tooth group TG9B is entirely different from the first tooth group TG9A. The first tooth group TG9A of the upshifting facilitation section SP9G is adjacent to the second tooth group TG9B of the downshifting facilitation section SP9H without another tooth therebetween.

The first tooth group TG9A includes upshifting teeth SP9G1 and SP9G2 and upshifting facilitation teeth SP9G3 and SP9G4. The second tooth group TG9B includes downshifting facilitation teeth SP9H1 and SP9H2 and downshifting teeth SP9H3 and SP9H4. A total number of the sprocket teeth SP9B of the second tooth group TG9B is equal to a total number of the sprocket teeth SP9B of the first tooth group TG9A. However, the total number of the sprocket teeth SP9B of the second tooth group TG9B can be different from the total number of the sprocket teeth SP9B of the first tooth group TG9A.

A total number of the sprocket teeth SP9B provided from an upstream end of the downshifting facilitation section SP9H to a downstream end of the upshifting facilitation section SP9G in the reverse rotational direction D12 is larger than a total number of the sprocket teeth SP9B provided from a downstream end of the downshifting facilitation section SP9H to an upstream end of the upshifting facilitation section SP9G in the driving rotational direction D11. In the present embodiment, the total number of the sprocket teeth SP9B provided from the upstream end of the downshifting facilitation section SP9H to the downstream end of the upshifting facilitation section SP9G in the reverse rotational direction D12 is seven. The total number of the sprocket teeth SP9B provided from the downstream end of the downshifting facilitation section SP9H to the upstream end of the upshifting facilitation section SP9G in the driving rotational direction D11 is zero. However, the positional relationship between the upshifting facilitation section SP9G and the downshifting facilitation section SP9H is not limited to the present embodiment.

The upshifting tooth SP9G2 is configured to initially derail the opposed inner link plates 20B of the bicycle chain 20 from the bicycle sprocket SP9 in the upshifting operation in a first state where the upshifting facilitation tooth SP9G3 is engaged in the outer-link space 20G (see, e.g., FIG. 15) of the opposed outer link plates 20A of the bicycle chain 20.

The upshifting tooth SP9G1 includes an upshifting recess SP9G1R provided on the sprocket outward side SP9F to facilitate the upshifting operation. The upshifting recess SP9G1R is configured to derail the opposed outer link plates 20A of the bicycle chain 20 in the upshifting operation if the upshifting tooth SP9G2 derails the opposed inner link plates 20B of the bicycle chain 20 from the bicycle sprocket SP9.

The upshifting tooth SP9G2 includes an upshifting recess SP9G2R provided on the sprocket outward side SP9F to facilitate the upshifting operation. The upshifting recess SP9G2R is configured to initially derail the opposed inner link plates 20B of the bicycle chain 20 in the upshifting operation.

Figure 17:
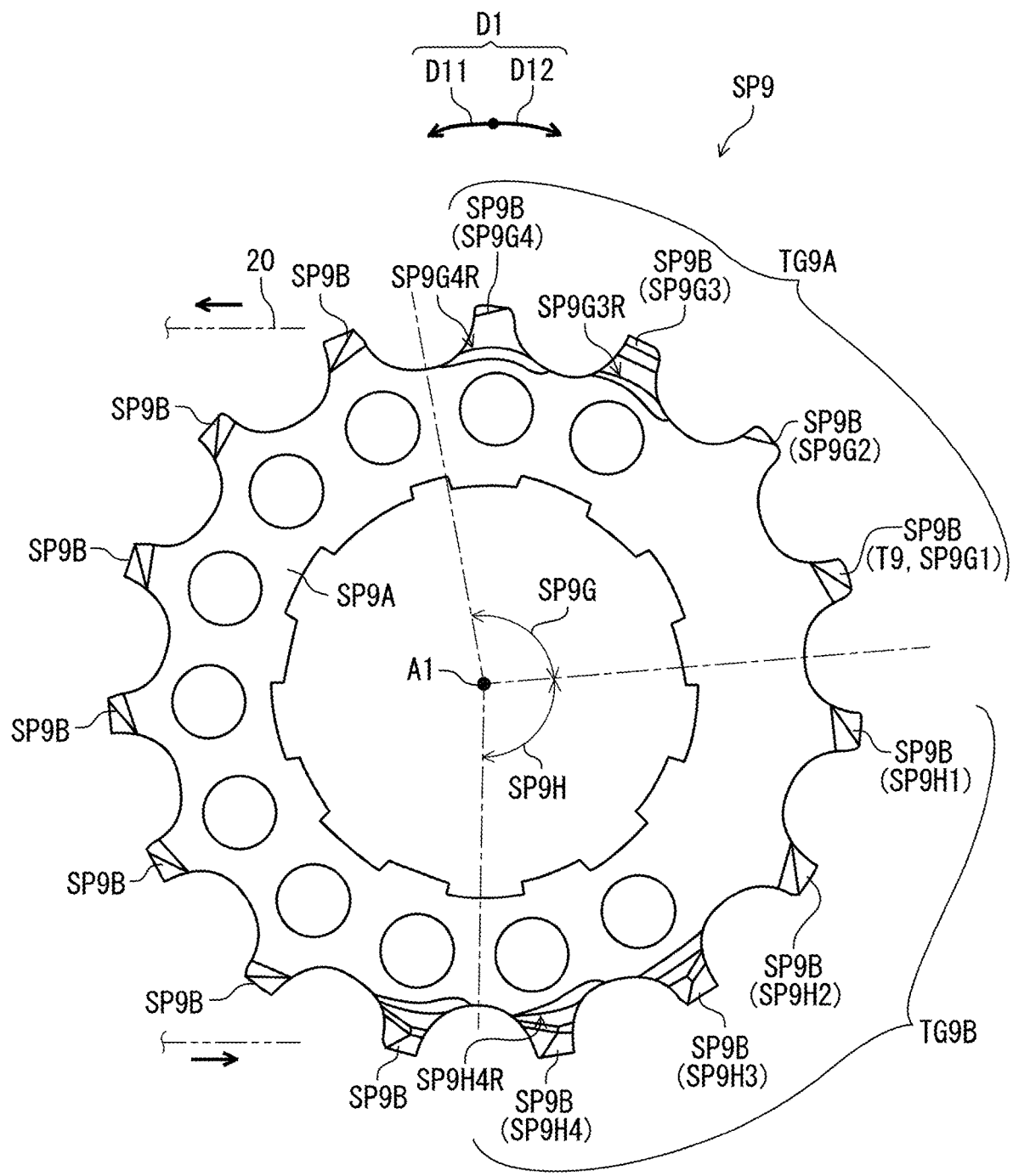
FIG. 17 is another side elevational view of the bicycle sprocket illustrated in FIG. 12.

As seen in FIG. 17, the upshifting facilitation tooth SP9G3 includes an upshifting facilitation recess SP9G3R provided on the sprocket inward side SP9E to facilitate the upshifting operation. The upshifting facilitation recess SP9G3R is configured to facilitate approaching of the bicycle chain 20 toward the smaller sprocket SP10 in the upshifting operation in a state where the bicycle chain 20 is engaged with the bicycle sprocket SP9.

The upshifting facilitation tooth SP9G4 includes an upshifting facilitation recess SP9G4R provided on the sprocket inward side SP9E to facilitate the upshifting operation. The upshifting facilitation recess SP9G4R is configured to facilitate approaching of the bicycle chain 20 toward the smaller sprocket SP10 in the upshifting operation in a state where the bicycle chain 20 is engaged with the bicycle sprocket SP9.

As seen in FIG. 12, the downshifting facilitation tooth SP9H1 includes a downshifting facilitation recess SP9H1R provided on the sprocket outward side SP9F to facilitate the downshifting operation. The downshifting facilitation recess SP9H1R is configured to reduce interference between the bicycle sprocket SP9 and the bicycle chain 20 in the downshifting operation. The downshifting facilitation recess SP9H1R is configured to facilitate approaching of the bicycle chain 20 from the smaller sprocket SP10 toward the bicycle sprocket SP9 in the downshifting operation in a state where the bicycle chain 20 is engaged with the smaller sprocket SP10.

The downshifting facilitation tooth SP9H2 includes a downshifting facilitation recess SP9H2R provided on the sprocket outward side SP9F to facilitate the downshifting operation. The downshifting facilitation recess SP9H2R is configured to reduce interference between the bicycle sprocket SP9 and the bicycle chain 20 in the downshifting operation. The downshifting facilitation recess SP9H2R is configured to facilitate approaching of the bicycle chain 20 from the smaller sprocket SP10 toward the bicycle sprocket SP9 in the downshifting operation in a state where the bicycle chain 20 is engaged with the smaller sprocket SP10.

The downshifting tooth SP9H3 includes a downshifting recess SP9H3R provided on the sprocket outward side SP9F to facilitate the downshifting operation. The downshifting recess SP9H3R is configured to facilitate engagement of the bicycle sprocket SP9 with the bicycle chain 20 in the downshifting operation.

As seen in FIG. 17, the downshifting tooth SP9H4 is configured to catch the opposed outer link plates 20A of the bicycle chain 20 in the downshifting operation if one of the opposed inner link plates 20B contacts the downshifting tooth SP9H3 during the downshifting operation. The downshifting tooth SP9H4 includes a downshifting recess SP9H4R provided on the sprocket inward side SP9E to facilitate the downshifting operation. The downshifting recess SP9H4R is configured to facilitate catching of the opposed outer link plates 20A of the bicycle chain 20 at the downshifting tooth SP9H4 in the downshifting operation.

As seen in FIG. 13, the bicycle sprocket SP10 further comprises an upshifting facilitation section SP10G and a downshifting facilitation section SP10H. The first sprocket SP10 includes the upshifting facilitation section SP10G. The first sprocket SP10 includes a downshifting facilitation section SP10H.

The upshifting facilitation section SP is configured to facilitate an upshifting operation where the bicycle chain 20 shifts from the first sprocket SP10 toward the second sprocket SP11 (see, e.g., FIG. 3). The upshifting facilitation section SP10G is intentionally designed to facilitate the upshifting operation where the bicycle chain 20 shifts from the first sprocket SP10 toward the second sprocket SP11. The second sprocket SP11 can also be referred to as a smaller sprocket SP11. Thus, the upshifting facilitation section SP10G is configured to facilitate the upshifting operation where the bicycle chain 20 shifts from the bicycle sprocket SP10 toward the smaller sprocket SP1T (see, e.g., FIG. 3) adjacent to the bicycle sprocket SP10 without another sprocket therebetween in the axial direction D2 with respect to the rotational center axis A1 of the bicycle sprocket SP10. The upshifting facilitation section SP10G is intentionally designed to facilitate the upshifting operation where the bicycle chain 20 shifts from the bicycle sprocket SP10 toward the smaller sprocket SP11.

The downshifting facilitation section SP10H is configured to facilitate a downshifting operation where the bicycle chain 20 shifts from the second sprocket SP11 (see, e.g., FIG. 3) toward the first sprocket SP10. The downshifting facilitation section SP10H is intentionally designed to facilitate the downshifting operation where the bicycle chain 20 shifts from the second sprocket SP11 toward the first sprocket SP10. Thus, the downshifting facilitation section SP is configured to facilitate the downshifting operation where the bicycle chain 20 shifts from the smaller sprocket SP11 (see, e.g., FIG. 3) toward the bicycle sprocket SP10. The downshifting facilitation section SP10H is intentionally designed to facilitate the downshifting operation where the bicycle chain 20 shifts from the smaller sprocket SP11 toward the bicycle sprocket SP10.

The downshifting facilitation section SP10H is disposed on an upstream side of the upshifting facilitation section SP10G in the circumferential direction D1. The downshifting facilitation section SP10H is disposed on an upstream side of the upshifting facilitation section SP10G in the circumferential direction D1 with respect to the rotational center axis A1 of the bicycle sprocket and with respect to the driving rotational direction D11. The downshifting facilitation section SP10H is disposed on an upstream side of the upshifting facilitation section SP10G in the driving rotational direction D11 without another shifting facilitation section between the upshifting facilitation section SP10G and the downshifting facilitation section SP10H.

The upshifting facilitation section SP10G is formed by a first tooth group TG10A in the plurality of sprocket teeth SP10B. The downshifting facilitation section SP10H is formed by a second tooth group TG10B in the plurality of sprocket teeth SP10B. The second tooth group TG10B is entirely different from the first tooth group TG10A. The first tooth group TG10A of the upshifting facilitation section SP10G is adjacent to the second tooth group TG10B of the downshifting facilitation section SP10H without another tooth therebetween.

The first tooth group TG10A includes upshifting teeth SP10G1 and SP10G2 and upshifting facilitation tooth SP10G3 and SP10G4. The second tooth group TG10B includes downshifting facilitation teeth SP10H1 and SP10H2 and downshifting tooth SP10H3 and SP10H4. A total number of the sprocket teeth SP of the second tooth group TG10B is equal to a total number of the sprocket teeth SP10B of the first tooth group TG10A. However, the total number of the sprocket teeth SP10B of the second tooth group TG10B can be different from the total number of the sprocket teeth SP10B of the first tooth group TG10A.

A total number of the sprocket teeth SP provided from an upstream end of the downshifting facilitation section SP10H to a downstream end of the upshifting facilitation section SP in the reverse rotational direction D12 is larger than a total number of the sprocket teeth SP10B provided from a downstream end of the downshifting facilitation section SP10H to an upstream end of the upshifting facilitation section SP10G in the driving rotational direction D11. In the present embodiment, the total number of the sprocket teeth SP10B provided from the upstream end of the downshifting facilitation section SP to the downstream end of the upshifting facilitation section SP in the reverse rotational direction D12 is five. The total number of the sprocket teeth SP10B provided from the downstream end of the downshifting facilitation section SP10H to the upstream end of the upshifting facilitation section SP10G in the driving rotational direction D11 is zero. However, the positional relationship between the upshifting facilitation section SP10G and the downshifting facilitation section SP10H is not limited to the present embodiment.

The upshifting tooth SP10G is configured to initially derail the opposed inner link plates 20B of the bicycle chain 20 from the bicycle sprocket SP10 in the upshifting operation in a state where the upshifting facilitation tooth SP10G3 is engaged in the outer-link space 20G (see, e.g., FIG. 15) of the opposed outer link plates 20A of the bicycle chain 20.

The upshifting tooth SP10G1 includes an upshifting recess SP10G1R provided on the sprocket outward side SP10F to facilitate the upshifting operation. The upshifting recess SP10G1R is configured to derail the opposed outer link plates 20A of the bicycle chain 20 in the upshifting operation if the upshifting tooth SP10G2 derails the opposed inner link plates 20B of the bicycle chain 20 from the bicycle sprocket SP10.

The upshifting tooth SP10G2 includes an upshifting recess SP10G2R provided on the sprocket outward side SP10F to facilitate the upshifting operation. The upshifting recess SP10G2R is configured to initially derail the opposed inner link plates 20B of the bicycle chain 20 in the upshifting operation.

Figure 18:
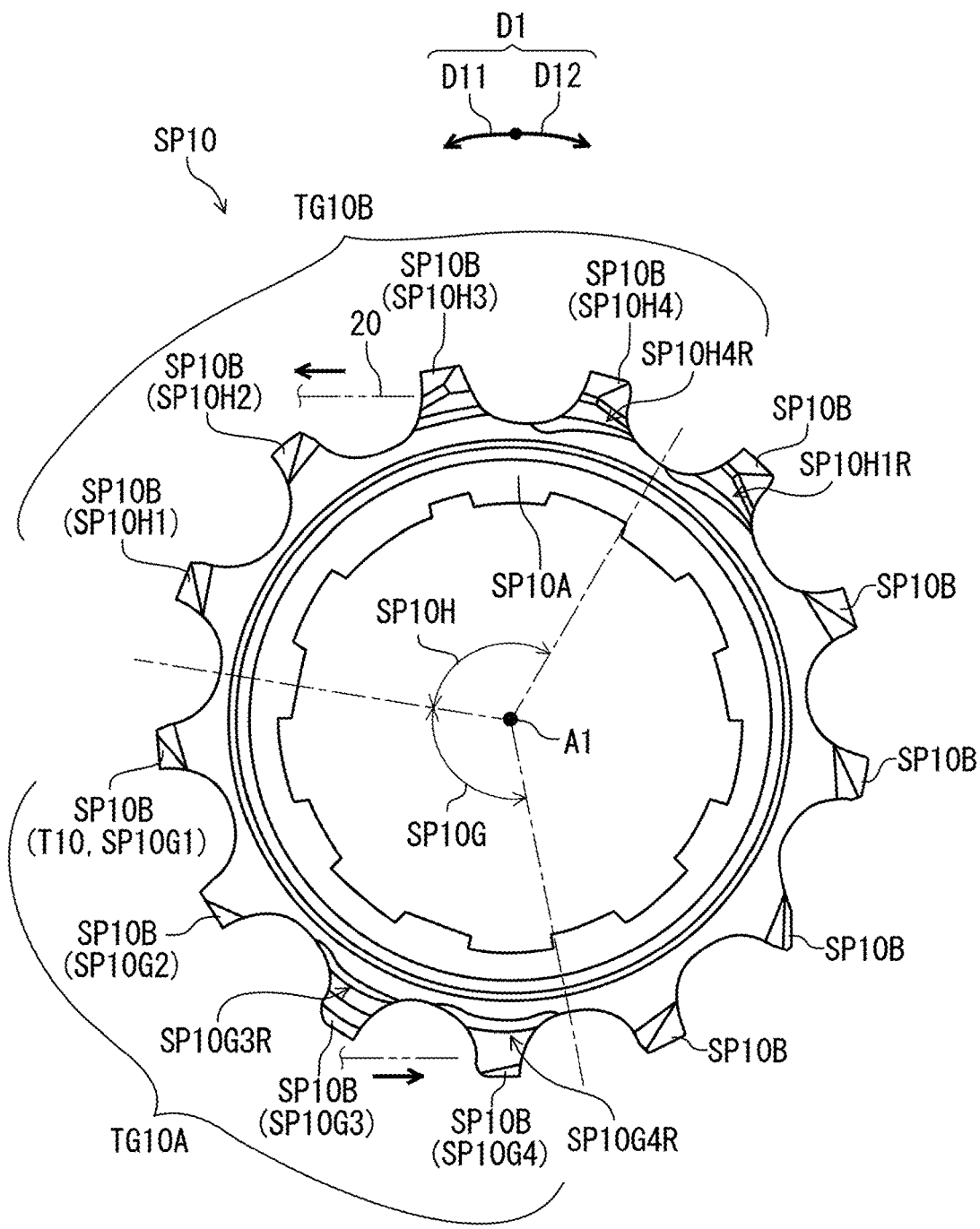
FIG. 18 is another side elevational view of the bicycle sprocket illustrated in FIG. 13.

As seen in FIG. 18, the upshifting facilitation tooth. SP10G3 includes an upshifting facilitation recess SP10G3R provided on the sprocket inward side SP10E to facilitate the upshifting operation. The upshifting facilitation recess SP10G3R is configured to facilitate approaching of the bicycle chain 20 toward the smaller sprocket SP11 in the upshifting operation in a state where the bicycle chain 20 is engaged with the bicycle sprocket SP10.

The upshifting facilitation tooth SP10G4 includes an upshifting facilitation recess SP10G4R provided on the sprocket inward side SP10E to facilitate the upshifting operation. The upshifting facilitation recess SP10G4R is configured to facilitate approaching of the bicycle chain 20 toward the smaller sprocket SP11 in the upshifting operation in a state where the bicycle chain 20 is engaged with the bicycle sprocket SP10.

As seen in FIG. 13, the downshifting facilitation tooth SP10H1 includes a downshifting facilitation recess SP10H1R provided on the sprocket outward side SP10F to facilitate the downshifting operation. The downshifting facilitation recess SP10H1R is configured to reduce interference between the bicycle sprocket SP10 and the bicycle chain 20 in the downshifting operation. The downshifting facilitation recess SP10H1R is configured to facilitate approaching of the bicycle chain 20 from the smaller sprocket SP11 toward the bicycle sprocket SP10 in the downshifting operation in a state where the bicycle chain 20 is engaged with the smaller sprocket SP11.

The downshifting facilitation tooth SP10H2 includes a downshifting facilitation recess SP10H2R provided on the sprocket outward side SP10F to facilitate the downshifting operation. The downshifting facilitation recess SP10H2R is configured to reduce interference between the bicycle sprocket SP10 and the bicycle chain 20 in the downshifting operation. The downshifting facilitation recess SP10H2R is configured to facilitate approaching of the bicycle chain 20 from the smaller sprocket SP11 toward the bicycle sprocket SP10 in the downshifting operation in a state where the bicycle chain 20 is engaged with the smaller sprocket SP11.

The downshifting tooth SP10H3 includes a downshifting recess SP10H3R provided on the sprocket outward side SP10F to facilitate the downshifting operation. The downshifting recess SP10H3R is configured to facilitate engagement of the bicycle sprocket SP10 with the bicycle chain 20 in the downshifting operation.

As seen in FIG. 18, the downshifting tooth SP10H4 is configured to catch the opposed outer link plates 20A of the bicycle chain 20 in the downshifting operation if one of the opposed inner link plates 20B contacts the downshifting tooth SP10H3 during the downshifting operation. The downshifting tooth SP10H4 includes a downshifting recess SP10H4R provided on the sprocket inward side SP10E to facilitate the downshifting operation. The downshifting recess SP10H4R is configured to facilitate catching of the opposed outer link plates 20A of the bicycle chain 20 at the downshifting tooth SP10H4 in the downshifting operation.

The upshifting facilitation sections SP8G, SP9G and SP10G and the downshifting facilitation sections SP8H, SP9H and SP10H of the bicycle sprockets SP8, SP9 and SP10 depicted in FIGS. 11 to 13 and 16 to 18 can apply to the bicycle sprockets SP1 to SP7 illustrated in FIGS. 4 to 10.

As seen in FIG. 11, the plurality of sprocket teeth SP8B includes at least one recessed tooth T8. In the present embodiment, the plurality of sprocket teeth SP8B includes recessed teeth T8. One of the recessed teeth T8 corresponds to the upshifting tooth SP8G1 of the first tooth group TG8A. Another of the recessed teeth T8 corresponds to the upshifting tooth SP8P1 of the third tooth group TG8C. A total number of the recessed teeth T8 is not limited to the present embodiment. The recessed teeth T8 have the same structure as each other. The recessed tooth can be any one of the teeth SP8G2, SP8H1, SP8H2, SP5P2, SP9G1, SP9G2, SP9H1, SP9H2, SP10G1, Sp1o G2, SP10H1, SP10H2 and recessed teeth provided on the sprockets SP1 to SP7 and SP11.

Figure 19:
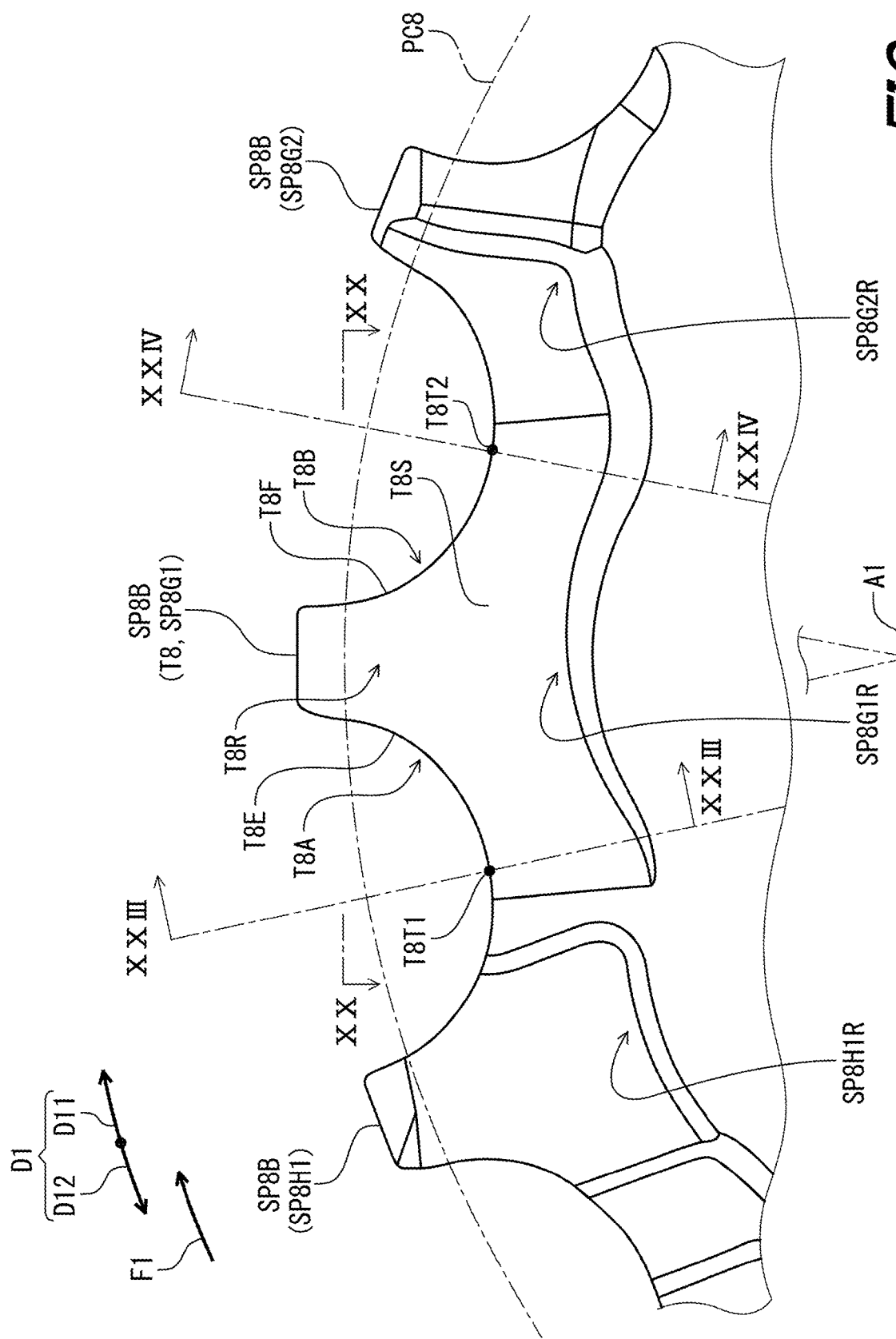
FIG. 19 is an enlarged side elevational view of the bicycle sprocket illustrated in FIG. 11.

As seen in FIG. 19, the at least one recessed tooth T8 has at least one recessed portion T8R. In the present embodiment, the recessed tooth T8 has a recessed portion T8R. However, the recessed tooth T8 can have a plurality of recessed portions T8R if needed and/or desired.

The at least one recessed portion TSR has a circumferentially upstream end T8A and a circumferentially downstream end T8B. The circumferentially downstream end T8B is opposite to the circumferentially upstream end T8A in the circumferential direction D1 with respect to the rotational center axis A1 and with respect to the driving rotational direction D11. The circumferentially downstream end TSB is provided on a downstream side of the circumferentially upstream end TSA in the driving rotational direction D11.

The recessed portion T8R includes a driving surface T8E and a non-driving surface T8F. The non-driving surface T8F is provided on a reverse side of the driving surface TSE in the circumferential direction D1. The non-driving surface T8F is provided on a downstream side of the driving surface T8E in the driving rotational direction D11. The driving surface T8E is configured to receive the driving rotational force F1 from the bicycle chain 20 during pedaling. The driving surface T8E is provided in the circumferentially upstream end T8A. The non-driving surface T8F is provided in the circumferentially downstream end T8B.

Figure 20:
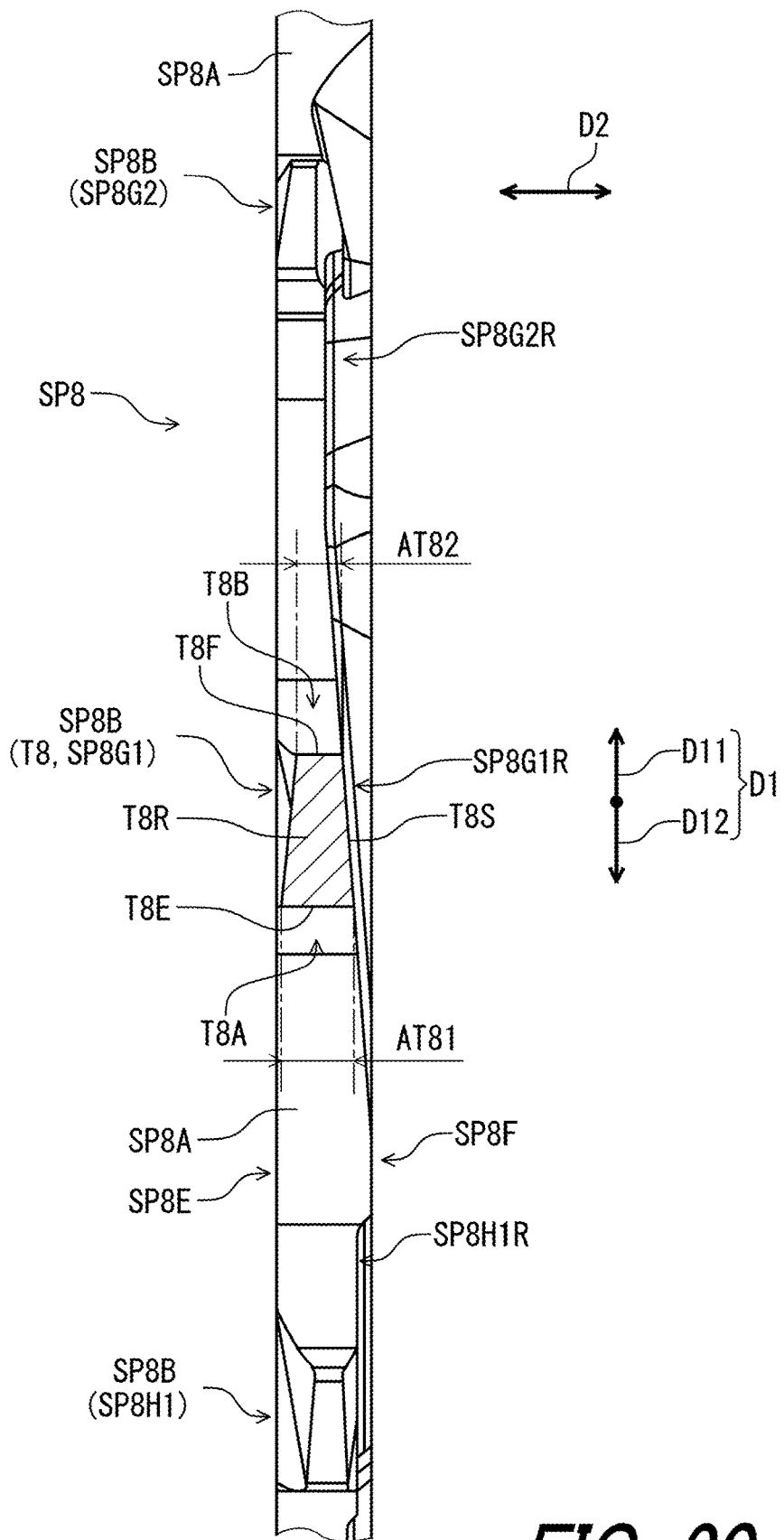
FIG. 20 is a cross-sectional view of the bicycle sprocket taken along line XX-XX of FIG. 19.

As seen in FIG. 20, the at least one recessed portion T8R is recessed from the sprocket outward side SP8F toward the sprocket inward side SP8E. The recessed portion T8R includes the upshifting recess SP8G1R. The at least one recessed portion T8R has a sloping surface T8S. The sloping surface T8S extends between the circumferentially upstream end T8A and the circumferentially downstream end T8B. The sloping surface T8S is inclined relative to the rotational center axis. The sloping surface T8S is inclined relative to the circumferential direction D1.

The circumferentially upstream end T8A has a first axial-thickness AT81 defined on the pitch circle diameter PC81 of the bicycle sprocket SP8. The first axial-thickness AT81 is defined in the axial direction D2. The circumferentially downstream end T8B has a second axial-thickness AT82 defined on the pitch circle diameter PC81 of the bicycle sprocket SP8. The second axial-thickness AT82 is defined in the axial direction D2. The second axial-thickness AT82 is smaller than the first axial-thickness AT81. The first axial-thickness AT81 is equal to or larger than 1.3 mm. The first axial-thickness AT81 is preferably equal to or larger than 1.4 mm. In the present embodiment, the first axial-thickness AT81 is equal to 1.5 mm. The second axial-thickness AT82 is equal to 0.87 mm. However, the first axial-thickness AT81 and the second axial-thickness AT82 are not limited to the present embodiment.

Figure 21:
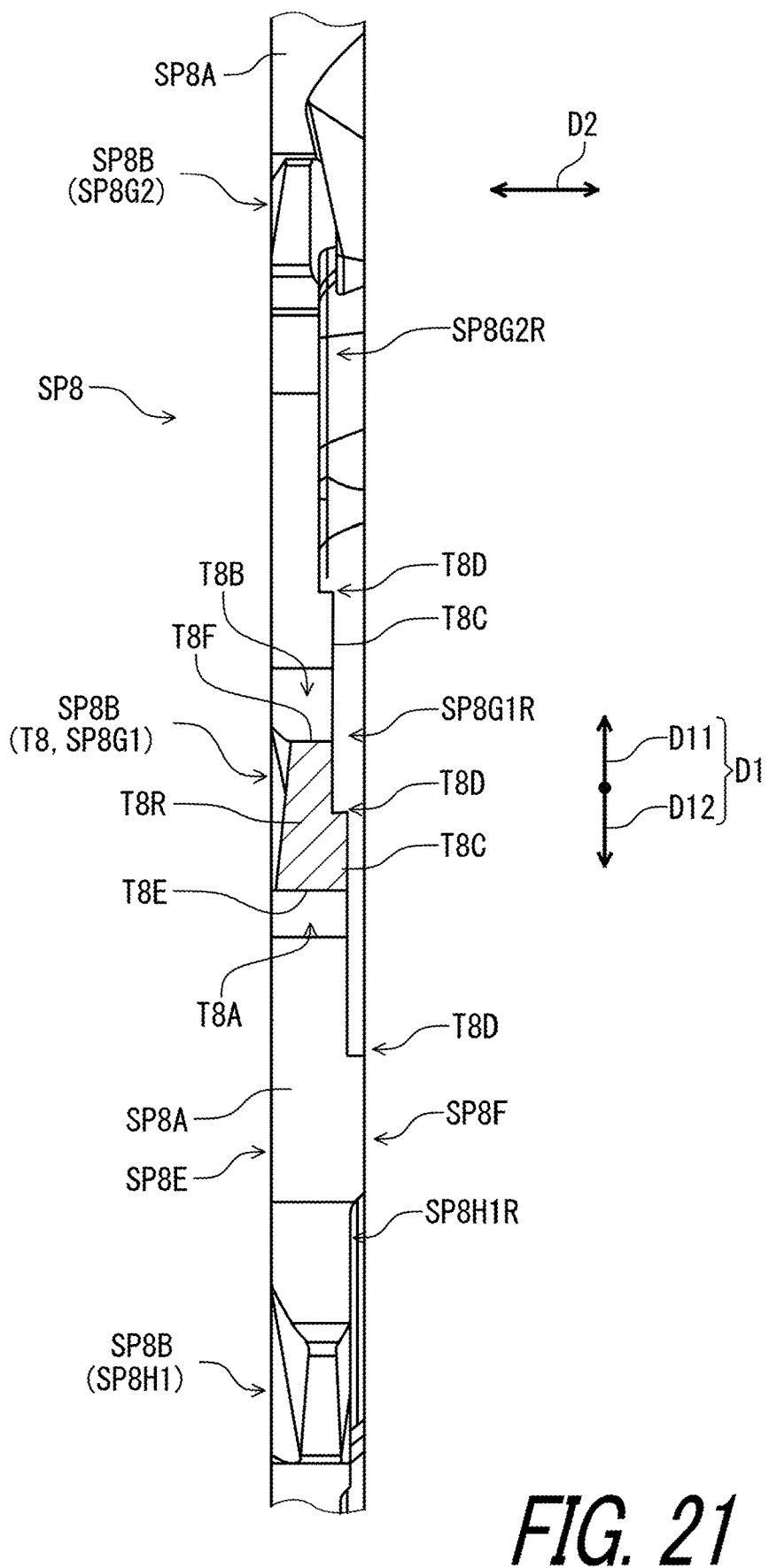
FIG. 21 is a cross-sectional view of a bicycle sprocket in accordance with a modification.

In the present embodiment, the sloping surface T8S does not have a stepped surface. As seen in FIG. 21, however, the at least one recessed portion T8R can have at least one stepped surface T8C provided between the circumferentially upstream end T8A and the circumferentially downstream end T8B. The at least one stepped surface T8C of the at least one recessed portion T8R forms at least three steps T8D. The stepped surfaces T8C of the at least one recessed portion T8R forms three steps T8D.

Figure 22:
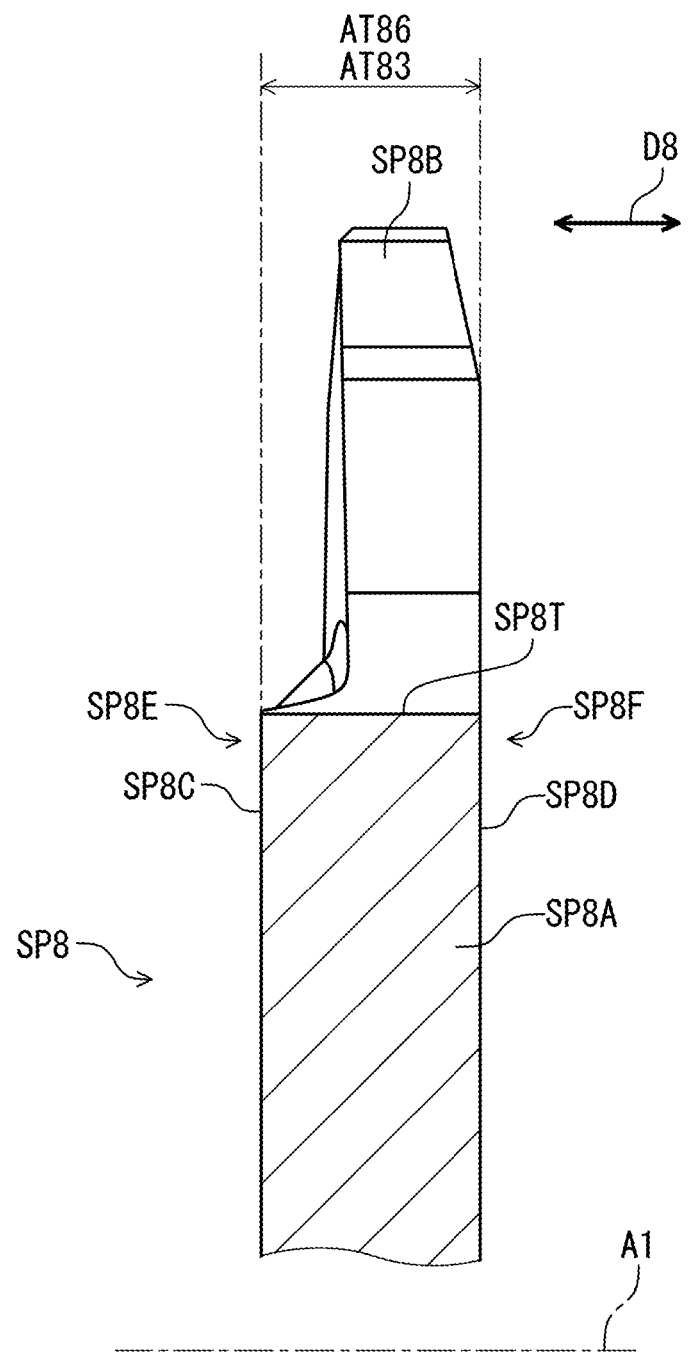
FIG. 22 is a cross-sectional view of the bicycle sprocket taken along line XXII-XXII of FIG. 11.

As seen in FIG. 22, at least one sprocket tooth of the plurality of sprocket teeth SP8B has an axial tooth-bottom thickness AT83 that is equal to or larger than 1.7 mm. The axial tooth-bottom thickness AT83 is defined at a tooth bottom SP8T of the sprocket teeth SP8B in the axial direction D2. The axial tooth-bottom thickness AT83 is larger than the first axial-thickness AT81 and the second axial-thickness AT82 depicted in FIG. 19.

The first sprocket body SP8A has an axial thickness AT86 defined in the axial direction D2. The axial thickness AT86 is equal to or smaller than 2.0 mm. The axial thickness AT86 is equal to the axial tooth-bottom thickness AT83. Each of the axial tooth-bottom thickness AT83 and the axial thickness AT86 ranges from 1.7 mm to 2.0 mm. In the present embodiment, each of the axial tooth-bottom thickness AT83 and the axial thickness AT86 is 1.95 mm. However, each of the axial tooth-bottom thickness AT83 and the axial thickness AT86 is not limited to the present embodiment and the above ranges.

Figure 23:
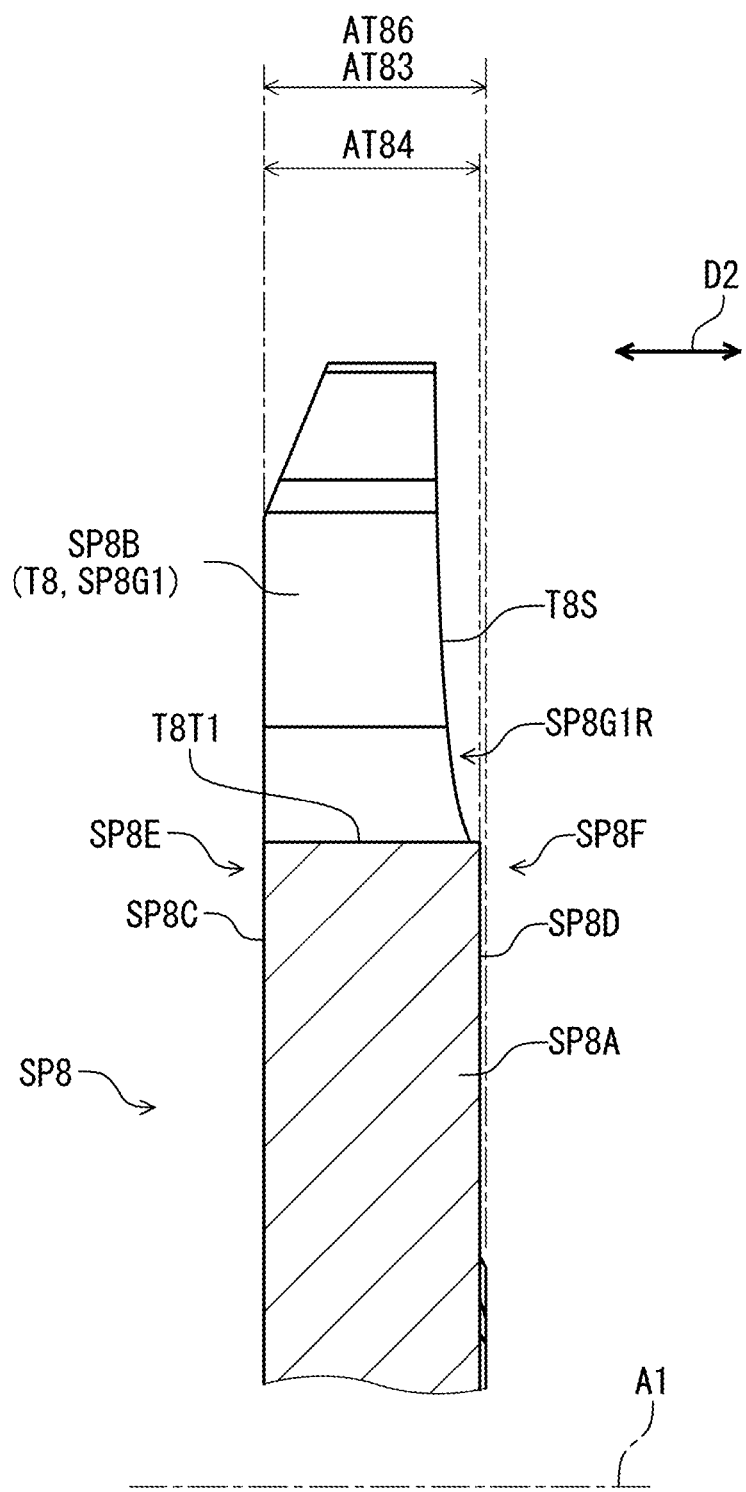
FIG. 23 is a cross-sectional view of the bicycle sprocket taken along line XXIII-XXIII of FIG. 19.

As seen in FIG. 23, the recessed tooth T8 has a first axial tooth-bottom thickness AT84 defined at a first tooth bottom T8T1 of the recessed tooth T8. The first axial tooth-bottom thickness AT84 is smaller than the axial tooth-bottom thickness AT83.

Figure 24:
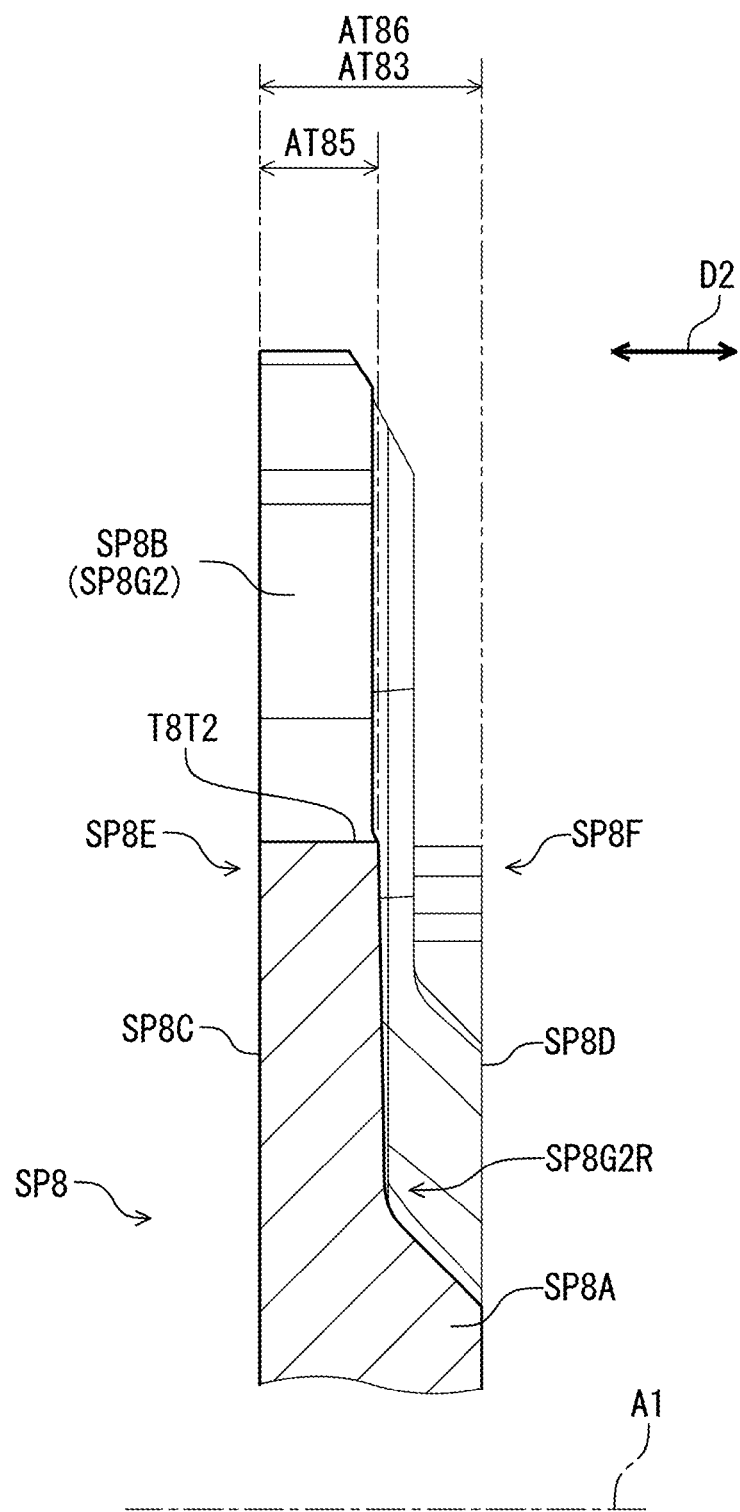
FIG. 24 is a cross-sectional view of the bicycle sprocket taken along line XXIV-XXIV of FIG. 19.

As seen in FIG. 24, the recessed tooth T8 has a second axial tooth-bottom thickness AT85 defined at a second tooth bottom T8T2 of the recessed tooth T8. The second axial tooth-bottom thickness AT85 is smaller than the axial tooth-bottom thickness AT83.

The structures of the bicycle sprocket SP8 depicted in FIGS. 19 to 24 applies to the bicycle sprockets SP1 to SP7, SP9, and SP10 depicted in FIGS. 4 to 10, 12, and 13. For example, as seen in FIG. 4, the plurality of sprocket teeth SP1B includes at least one recessed tooth T1. As seen in FIG. 5, the plurality of sprocket teeth SP2B includes at least one recessed tooth T2. As seen in FIG. 6, the plurality of sprocket teeth SP3B includes at least one recessed tooth T3. As seen in FIG. 7, the plurality of sprocket teeth SP4B includes at least one recessed tooth T4. As seen in FIG. 8, the plurality of sprocket teeth SP5B includes at least one recessed tooth T5. As seen in FIG. 9, the plurality of sprocket teeth SP6B includes at least one recessed tooth T6. As seen in FIG. 10, the plurality of sprocket teeth SP7B includes at least one recessed tooth T7. As seen in FIG. 12, the plurality of sprocket teeth SP9B includes at least one recessed tooth T9. As seen in FIG. 13, the plurality of sprocket teeth SP10B includes at least one recessed tooth T10. The recessed teeth T1 to T7, T9, and T10 have substantially the same structure as the structure of the recessed tooth T8 of the bicycle sprocket S8. Thus, they will not be described in detail here for the sake of brevity.

Figure 25:
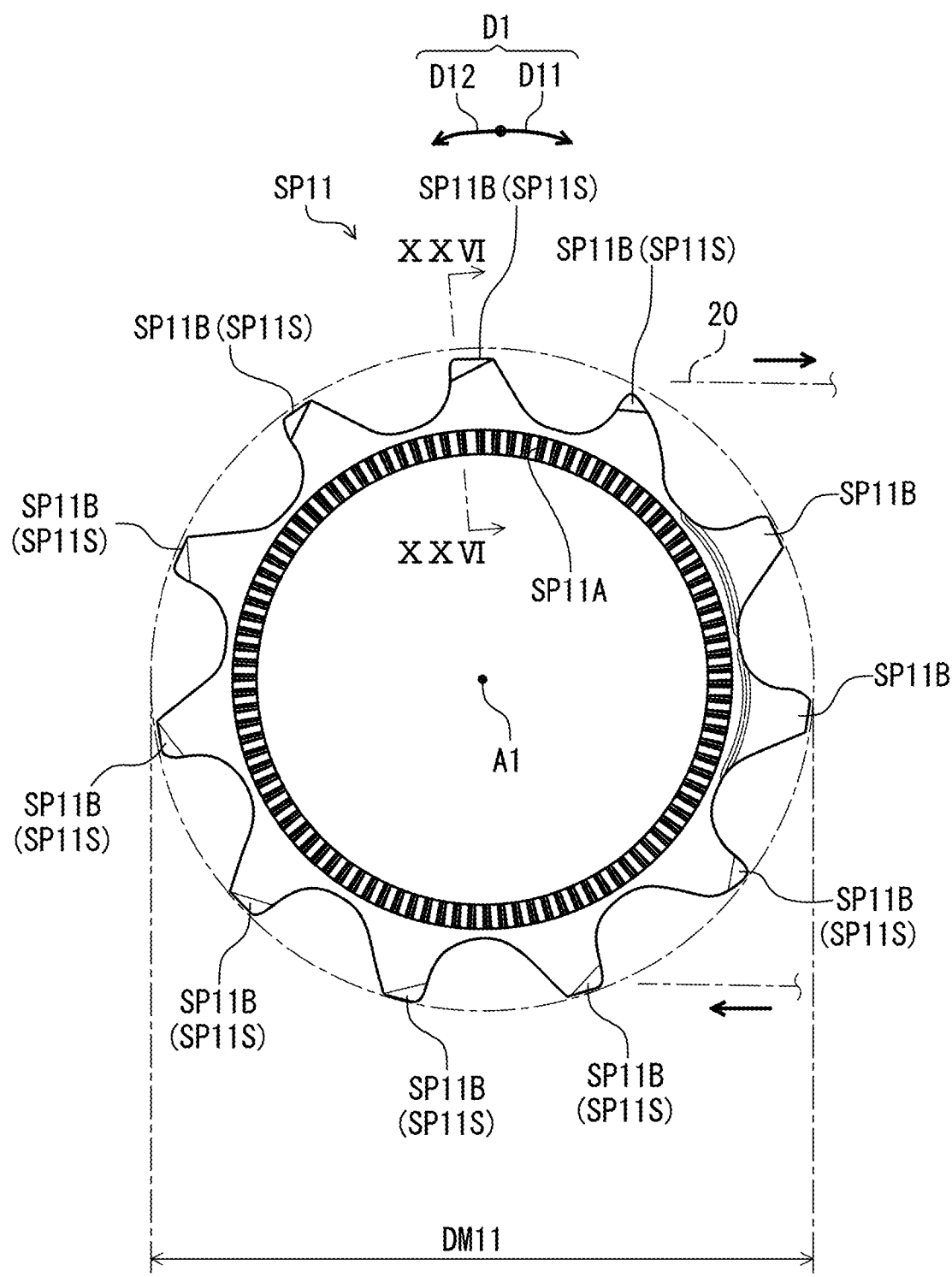
FIG. 25 is a side elevational view of a bicycle sprocket of the bicycle sprocket assembly illustrated in FIG. 2.

As seen in FIG. 25, the bicycle sprocket SP11 comprises a sprocket body SP11A and a plurality of sprocket teeth SP11B. The plurality of sprocket teeth SP11B extends radially outwardly from the sprocket body SP11A. The plurality of sprocket teeth SP11B is disposed on an outer periphery of the sprocket body SP11A. The plurality of sprocket teeth SP defines a maximum tooth-tip diameter DM11. The maximum tooth-tip diameter DM11 is smaller than the maximum tooth-tip diameter DM10 of the bicycle sprocket SP10.

Figure 26:
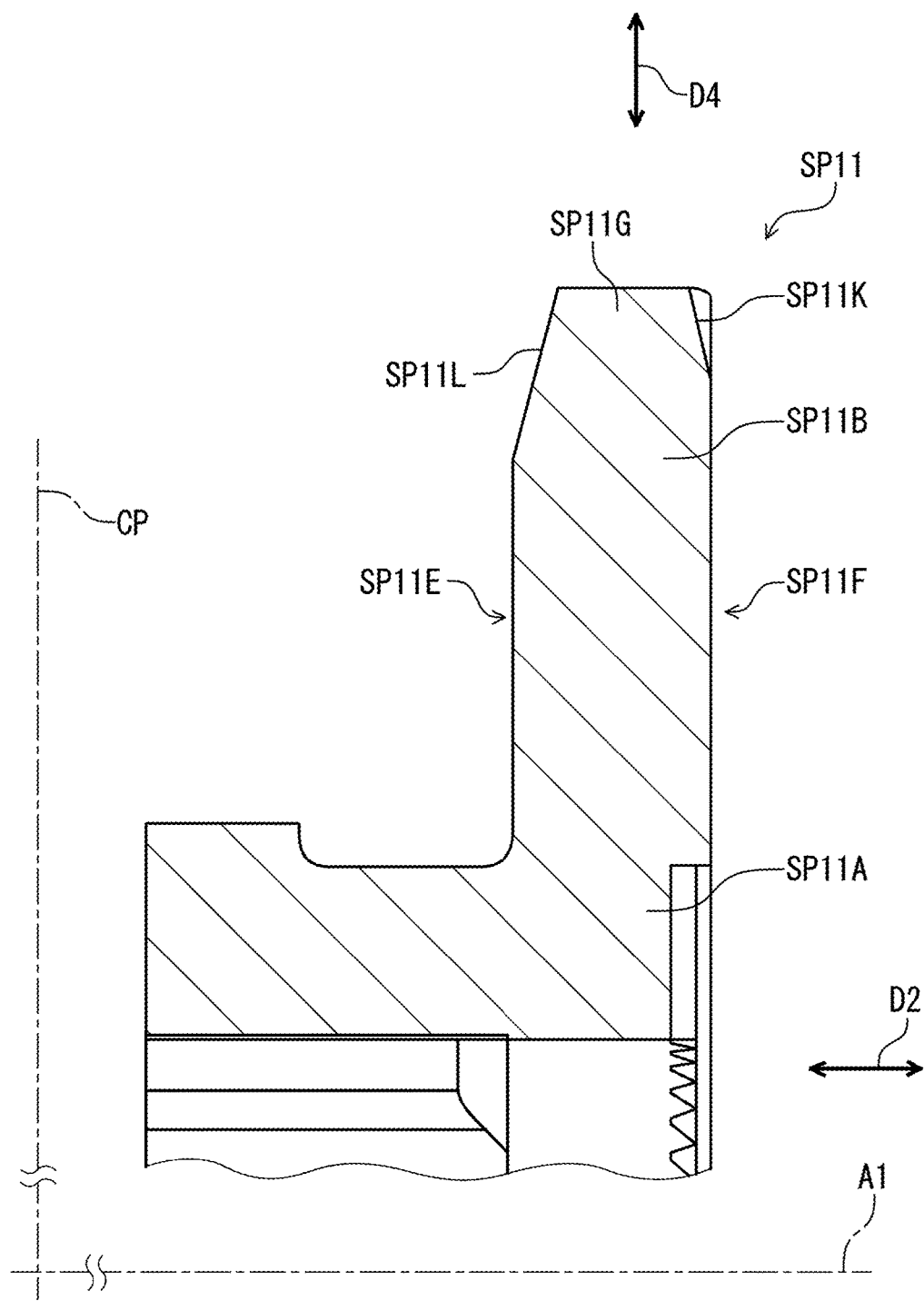
FIG. 26 is a cross-sectional view of the bicycle sprocket taken along line XXVI-XXVI of FIG. 25.

As seen in FIG. 26, the bicycle sprocket SP11 comprises a sprocket inward side SP11E and a sprocket outward side SP11F. The sprocket inward side SP11E is configured to be closer to the axial center plane CP of the bicycle 2 than the sprocket outward side SP11F in a mounting state where the bicycle sprocket SP11 is mounted to the bicycle 2. The sprocket outward side SP11F is provided on a reverse side of the sprocket inward side SP11E in the axial direction D2 with respect to the rotational center axis A1 of the bicycle sprocket SP11.

Figure 27:
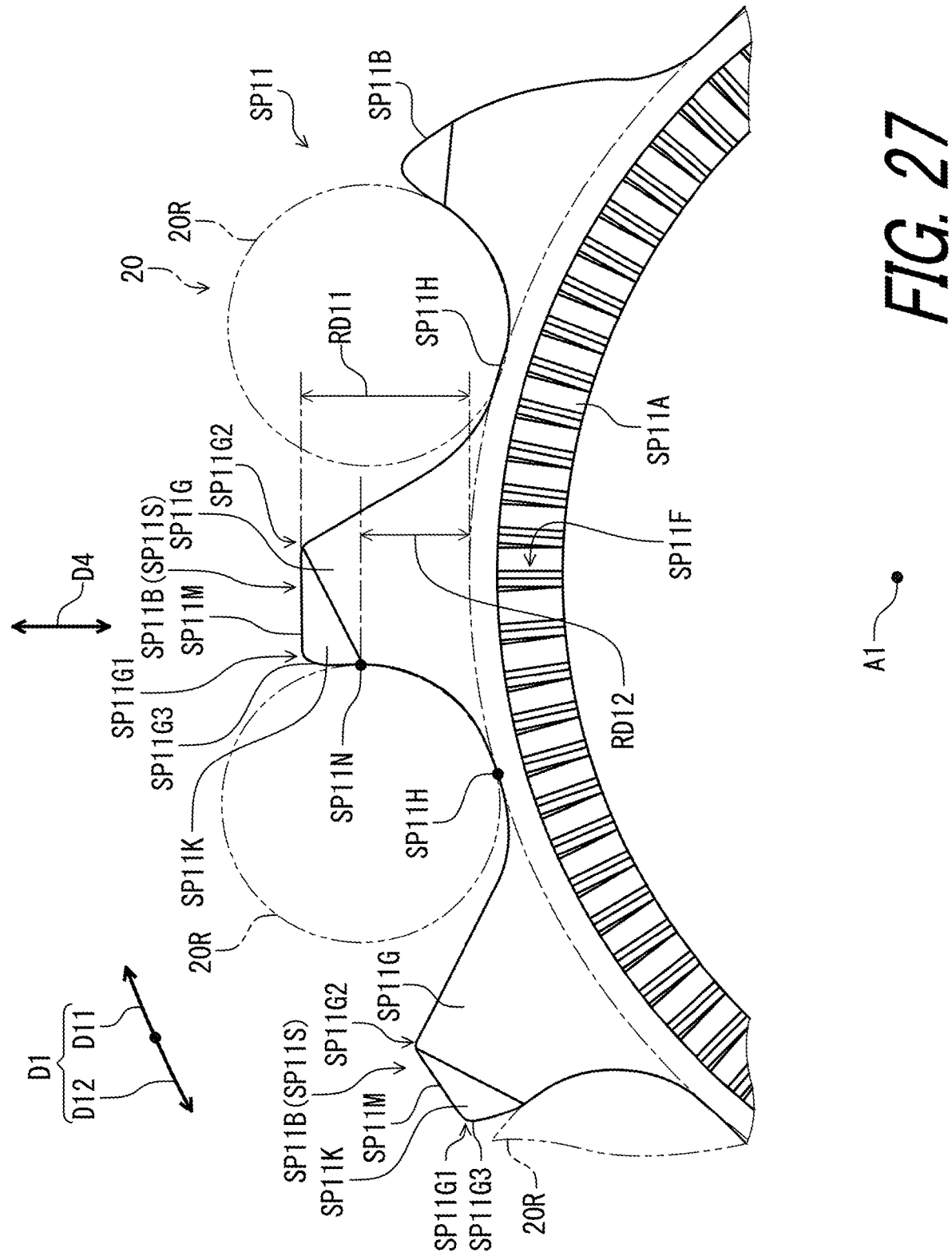
FIG. 27 is an enlarged side elevational view of the bicycle sprocket illustrated in FIG. 25.
Figure 28:
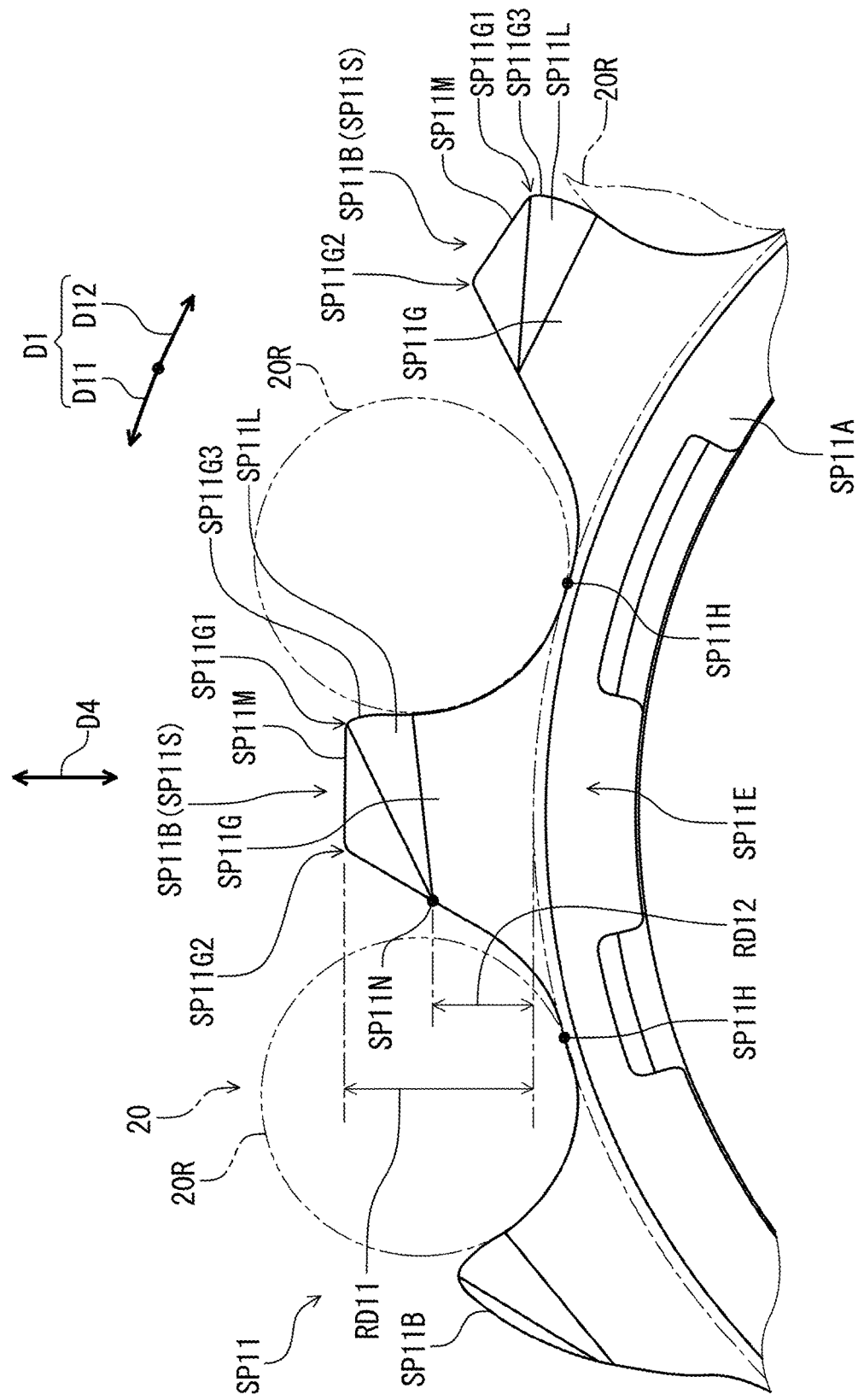
FIG. 28 is another enlarged side elevational view of the bicycle sprocket illustrated in FIG. 25.

As seen in FIGS. 27 and 28, at least one of the plurality of sprocket teeth SP11B has a tooth tip SP11G, a tooth bottom SP11H and at least one tooth-tip chamfer SP11K and/or SP11L. The at least one tooth-tip chamfer SP is formed on the tooth tip SP11G in at least one of the sprocket outward side SP11F and the sprocket inward side SP11E. The at least one tooth-tip chamfer SP11K and/or SP11L has a radially outermost end SP11M and a radially innermost end SP11N with respect to the rotational center axis A1 of the bicycle sprocket SP11.

In the present embodiment, as seen in FIG. 25, the plurality of sprocket teeth SP11B includes a plurality of chamfered teeth SP11S. As seen in FIGS. 27 and 28, each of the chamfered teeth SP11S has the tooth tip SP11G, the tooth bottom SP11H, and the at least one tooth-tip chamfer SP11K and/or SP11L. However, a total number of the chamfered teeth SP is not limited to the present embodiment.

As seen in FIG. 28, the tooth-tip chamfer SP11K is provided on the sprocket outward side SP11F. The tooth-tip chamfer SP has the radially outermost end SP11M and the radially innermost end SP11N. As seen in FIG. 28, the tooth-tip chamfer SP11L is provided on the sprocket inward side SP11E. The tooth-tip chamfer SP11L has the radially outermost end SP11M and the radially innermost end SP11N.

As seen in FIGS. 27 and 28, a radial tooth-tip distance RD11 is defined from the tooth bottom SP11H to the tooth tip SP11G in a radial direction D4 with respect to the rotational center axis A1. The radial tooth-tip distance RD11 is equal to or larger than 4.5 mm. A radial chamfer distance RD12 is defined from the tooth bottom SP11H to the radially innermost end SP11N of the at least one tooth-tip chamfer SP11K in the radial direction D4. The radial chamfer distance RD12 is equal to or larger than 3 mm.

In the present embodiment, the radial tooth-tip distance RD11 is 4.95 min. The radial chamfer distance RD12 of the tooth-tip chamfer SP11K is 3.45 mm. The radial chamfer distance RD12 of the tooth-tip chamfer SP11L is 3.45 mm. However, the radial tooth-tip distance RD11, the radial chamfer distance RD12 of the tooth-tip chamfer SP11K, and the radial chamfer distance RD12 of the tooth-tip chamfer SP11L are not limited to the present embodiment and the above ranges.

As seen in FIG. 27, the tooth tip SP11G has a circumferentially upstream tooth-tip end SP11G1 and a circumferentially downstream tooth-tip end SP11G2. The circumferentially downstream tooth-tip end SP11G2 is opposite to the circumferentially upstream tooth-tip end SP11G1 in the circumferential direction D1 with respect to the rotational center axis A1 and with respect to the driving rotational direction D11. The circumferentially downstream tooth-tip end SP is provided on a downstream side of the circumferentially upstream tooth-tip end SP11G1 in the driving rotational direction D11.

The circumferentially upstream tooth-tip end SP11G1 has a convex curvature portion SP11G3 configured to contact a chain roller 20R of the bicycle chain 20 during a driving operation of the bicycle 2. The convex curvature portion SP11G3 is configured to contact the chain roller 20R of the bicycle chain 20 during pedaling. The convex curvature portion SP11G3 has a curved outline as viewed along the rotational center axis A1. The structures of the bicycle sprocket SP1 depicted in FIGS. 25 to 28 can apply to the bicycle sprockets SP1 to SP10.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the tem "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
   a first sprocket including:
     a first sprocket body;
     a plurality of first sprocket teeth disposed on an outer periphery of the first sprocket body, the plurality of first sprocket teeth defining a first maximum tooth-tip diameter;
     a first sprocket inward surface configured to face toward an axial center plane of a bicycle in a mounting state where the bicycle sprocket assembly is mounted to the bicycle; and
     a first sprocket outward surface provided on a reverse side of the first sprocket inward surface in an axial direction with respect to a rotational center axis of the bicycle sprocket, and
   a second sprocket adjacent to the first sprocket without another sprocket therebetween in the axial direction, the second sprocket including:
     a second sprocket body;

a plurality of second sprocket teeth disposed on an outer periphery of the second sprocket body, the plurality of second sprocket teeth defining a second maximum tooth-tip diameter smaller than the first maximum tooth-tip diameter;

a second sprocket inward surface configured to face toward the axial center plane of the bicycle in the mounting state; and a second sprocket outward surface provided on a reverse side of the second sprocket inward surface in the axial direction, the first sprocket including:

an upshifting facilitation section configured to facilitate an upshifting operation where a bicycle chain shifts from the first sprocket toward the second sprocket; and an axial space defined between the first sprocket outward surface of one of the plurality of first sprocket teeth and an axially inward outer link plate of a pair of opposed outer link plates of the bicycle chain in the axial direction while the second sprocket outward surface of one of the plurality of second sprocket teeth contacts an axially outward inner link plate of a pair of opposed inner link plates of the bicycle chain in an engagement state where the one of the plurality of the second sprocket teeth is positioned between an axially inward inner link plate and the axially outward inner link plate of the pair of opposed inner link plates in the axial direction, the axially inward outer link plate and an axially outward outer link plate of the pair of opposed outer link plates being spaced apart from each other in the axial direction in an assembled state of the bicycle chain, the axially inward inner link plate and the axially outward inner link plate of the pair of opposed inner link plates being spaced apart from each other in the axial direction in the assembled state of the bicycle chain, a portion of the first sprocket outward surface used to define the axial space being an outward-most surface of the first sprocket in the axial direction, and the axial space being larger than 0 mm and equal to or smaller than 0.15 mm.

2. The bicycle sprocket assembly according to claim 1, wherein
the first sprocket includes a downshifting facilitation section configured to facilitate a downshifting operation where the bicycle chain shifts from the second sprocket toward the first sprocket.

3. A bicycle sprocket comprising:
a sprocket body;
a sprocket inward side;
a sprocket outward side, the sprocket inward side being configured to be closer to an axial center plane of a bicycle than the sprocket outward side in a mounting state where the bicycle sprocket is mounted to the bicycle, the sprocket outward side being provided on a reverse side of the sprocket inward side in an axial direction with respect to a rotational center axis of the bicycle sprocket; and
a plurality of sprocket teeth disposed on an outer periphery of the sprocket body, the plurality of sprocket teeth including at least one recessed tooth having at least one recessed portion recessed from the sprocket outward side toward the sprocket inward side, the at least one recessed portion having a circumferentially upstream end and a circumferentially downstream end opposite to the circumferentially upstream end in a circumferential direction with respect to the rotational center axis and with respect to a driving rotational direction, the circumferentially upstream end having a first axial-thickness defined on a pitch circle diameter of the bicycle sprocket, the circumferentially downstream end having a second axial-thickness defined on the pitch circle diameter of the bicycle sprocket, the second axial-thickness being smaller than the first axial-thickness, the first axial-thickness being equal to or larger than 1.3 mm.

4. The bicycle sprocket according to claim 3, wherein
each of the plurality of sprocket teeth is configured to enter each of an outer-link space defined between a pair of opposed outer link plates of a bicycle chain and an inner-link space defined between a pair of opposed inner link plates of the bicycle chain.

5. The bicycle sprocket according to claim 3, wherein
the at least one recessed portion has a sloping surface extending between the circumferentially upstream end and the circumferentially downstream end.

6. The bicycle sprocket according to claim 3, wherein
the at least one recessed portion has at least one stepped surface provided between the circumferentially upstream end and the circumferentially downstream end.

7. The bicycle sprocket according to claim 6, wherein
the at least one stepped surface of the at least one recessed portion forms at least three steps.

8. The bicycle sprocket according to claim 3 further comprising:
an upshifting facilitation section configured to facilitate an upshifting operation where a bicycle chain shifts from the bicycle sprocket toward a smaller sprocket adjacent to the bicycle sprocket without another sprocket therebetween in the axial direction; and
a downshifting facilitation section configured to facilitate a downshifting operation where the bicycle chain shifts from the smaller sprocket toward the bicycle sprocket, wherein
the downshifting facilitation section is disposed on an upstream side of the upshifting facilitation section in the circumferential direction.

9. The bicycle sprocket according to claim 8, wherein
the upshifting facilitation section is formed by a first tooth group in the plurality of sprocket teeth,
the downshifting facilitation section is formed by a second tooth group in the plurality of sprocket teeth, and
the second tooth group is entirely different from the first tooth group.

10. A bicycle sprocket comprising:
a sprocket body;
a plurality of sprocket teeth disposed on an outer periphery of the sprocket body;
an upshifting facilitation section configured to facilitate an upshifting operation where a bicycle chain shifts from the bicycle sprocket toward a smaller sprocket adjacent to the bicycle sprocket without another sprocket therebetween in an axial direction with respect to a rotational center axis of the bicycle sprocket, the upshifting facilitation section being formed by a first tooth group in the plurality of sprocket teeth; and
a downshifting facilitation section configured to facilitate a downshifting operation where the bicycle chain shifts from the smaller sprocket toward the bicycle sprocket, the downshifting facilitation section being formed by a second tooth group in the plurality of sprocket teeth, the second tooth group being entirely different from the first tooth group, the downshifting facilitation section being disposed on an upstream side of the upshifting facilitation section in a circumferential direction with respect to the rotational center axis of the bicycle sprocket and with respect to a driving rotational direction, at least one sprocket tooth of the plurality of sprocket teeth having an axial tooth-bottom thickness that is equal to or larger than 1.7 mm.

11. The bicycle sprocket according to claim 10, wherein the first tooth group of the upshifting facilitation section is adjacent to the second tooth group of the downshifting facilitation section without another tooth therebetween.

12. The bicycle sprocket according to claim 10, wherein each of the plurality of sprocket teeth is configured to enter each of an outer-link space defined between a pair of opposed outer link plates of a bicycle chain and an inner-link space defined between a pair of opposed inner link plates of the bicycle chain.

13. A bicycle sprocket comprising:
a sprocket body;
a sprocket inward side;
a sprocket outward side, the sprocket inward side being configured to be closer to an axial center plane of a bicycle than the sprocket outward side in a mounting state where the bicycle sprocket is mounted to the bicycle, the sprocket outward side being provided on a reverse side of the sprocket inward side in an axial direction with respect to a rotational center axis of the bicycle sprocket; and a plurality of sprocket teeth disposed on an outer periphery of the sprocket body, at least one of the plurality of sprocket teeth having a tooth tip, a tooth bottom and at least one tooth-tip chamfer formed on the tooth tip in at least one of the sprocket outward side and the sprocket inward side, the at least one tooth-tip chamfer having a radially outermost end and a radially innermost end with respect to a rotational center axis of the bicycle sprocket, a radial tooth-tip distance defined from the tooth bottom to the tooth tip in a radial direction with respect to the rotational center axis being equal to or larger than 4.5 mm, and a radial chamfer distance defined from the tooth bottom to the radially innermost end of the at least one tooth-tip chamfer in the radial direction being equal to or larger than 3 mm.

14. The bicycle sprocket according to claim 13, wherein the tooth tip has a circumferentially upstream tooth-tip end and a circumferentially downstream tooth-tip end opposite to the circumferentially upstream tooth-tip end in a circumferential direction with respect to the rotational center axis and with respect to a driving rotational direction, and the circumferentially upstream tooth-tip end has a convex curvature portion configured to contact a chain roller of a bicycle chain during a driving operation of a bicycle.

* * * * *